United States Patent
Zhou et al.

(10) Patent No.: US 7,569,508 B2
(45) Date of Patent: *Aug. 4, 2009

(54) REFORMING NANOCATALYSTS AND METHOD OF MAKING AND USING SUCH CATALYSTS

(75) Inventors: Bing Zhou, Cranbury, NJ (US); Horacio Treviño, Annandale, NJ (US); Zhihua Wu, Lawrenceville, NJ (US); Zhenhua Zhou, Pennington, NJ (US); Changkun Liu, Lawrenceville, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 620 days.

This patent is subject to a terminal disclaimer.

(21) Appl. No.: 11/101,241

(22) Filed: Apr. 7, 2005

(65) Prior Publication Data

US 2006/0102521 A1    May 18, 2006

Related U.S. Application Data

(60) Provisional application No. 60/643,836, filed on Jan. 14, 2005.

(51) Int. Cl.
*B01J 31/00* (2006.01)
*B01J 23/00* (2006.01)
*B01J 23/40* (2006.01)
*B01J 21/04* (2006.01)
*B01J 23/42* (2006.01)
*B01J 23/02* (2006.01)
*C10G 35/00* (2006.01)
*C10G 35/04* (2006.01)
*C10G 35/06* (2006.01)
*C07C 15/02* (2006.01)
*C07C 403/00* (2006.01)
*C07C 6/00* (2006.01)
*C07C 2/52* (2006.01)
*C07C 5/41* (2006.01)

(52) U.S. Cl. .................. 502/150; 502/107; 502/111; 502/173; 502/300; 502/325; 502/327; 502/439; 208/133; 208/134; 208/137; 585/400; 585/419; 585/434

(58) Field of Classification Search .............. 502/150, 502/305–355, 107, 111, 173, 300, 439; 208/133, 208/134, 137; 585/400, 419, 434

See application file for complete search history.

(56) References Cited

U.S. PATENT DOCUMENTS

| | | | |
|---|---|---|---|
| 3,625,879 A | 12/1971 | Horne et al. | |
| 3,644,200 A | 2/1972 | Young | |
| 3,674,706 A | 7/1972 | Box, Jr. et al. | |
| 3,686,340 A | 8/1972 | Patrick et al. | |
| 3,700,745 A | 10/1972 | Kovach et al. | |
| 4,007,256 A | 2/1977 | Kim et al. | |
| 4,028,274 A | 6/1977 | Kunz | |
| 4,053,531 A | 10/1977 | Kerr et al. | |
| 4,064,154 A | 12/1977 | Chandra et al. | |
| 4,083,803 A | 4/1978 | Oswald et al. | |
| 4,128,627 A | 12/1978 | Dyer et al. | |
| 4,148,750 A | 4/1979 | Pine | |
| 4,157,355 A | 6/1979 | Addison | |
| 4,247,730 A | 1/1981 | Brunelle | |
| 4,279,883 A | 7/1981 | Izumi et al. | |
| 4,297,205 A | 10/1981 | Mieville | |
| 4,335,092 A | 6/1982 | Dalton, Jr. et al. | |
| 4,336,239 A | 6/1982 | Dalton, Jr. et al. | |
| 4,336,240 A | 6/1982 | Moseley et al. | |
| 4,347,231 A | 8/1982 | Michaelson | |
| 4,347,232 A | 8/1982 | Michaelson | |
| 4,366,085 A | 12/1982 | Ikegami et al. | |
| 4,379,778 A | 4/1983 | Dalton, Jr. et al. | |
| 4,454,240 A | 6/1984 | Ganguli | |
| 4,476,242 A | 10/1984 | Puskas et al. | |

(Continued)

FOREIGN PATENT DOCUMENTS

EP    0 864 362    9/1998

(Continued)

OTHER PUBLICATIONS

Search Report from PCT/US05/42841.*
Search Report for PCT/US2005/042841.*
Ahmadi, et al., "Shape-Controlled Synthesis of Colloidal Platinum Nanoparticles" *Science*, vol. 272, pp. 1924-1926 (Jun. 28, 1996).
Li, et al., "Carbon Nanotubes as Support for Cathode Catalyst of a Direct Methanol Fuel Cell", *Letters to the Editor/Carbon 40*, Dalian University of Technology, pp. 787-803 (Jan. 18, 2002).

(Continued)

*Primary Examiner*—Patricia L Hailey
(74) *Attorney, Agent, or Firm*—Workman Nydegger

(57) ABSTRACT

Reforming nanocatalysts are formed using a dispersing agent to increase the activity, selectivity and longevity of the catalyst when used in a reforming process. The nanocatalyst particles are formed using a dispersing agent having at least one functional group selected from the group of a hydroxyl, a carboxyl, a carbonyl, an amide, an amine, a thiol, a sulfonic acid, sulfonyl halide, an acyl halide, an organometallic complex, and combinations of these. The dispersing agent is particularly useful for forming multicomponent catalysts comprising an alloy, combination, mixture, decoration, or interspersion of platinum and one or more of tin, rhenium or iridium. The formation of the nanoparticles may include a heat treating process performed in an inert or oxidative environment to maintain the catalyst atoms in a non-zero oxidation state to thereby maintain a stronger bond between the dispersing agent and the catalyst atoms. Multicomponent reforming catalysts having anchored nanocatalyst particles exhibit particularly good activity, selectivity and longevity when used in the reforming of naphtha and/or formation of BTX.

30 Claims, No Drawings

U.S. PATENT DOCUMENTS

| | | | |
|---|---|---|---|
| 4,503,160 A | 3/1985 | Williams, Jr. | |
| 4,513,098 A | 4/1985 | Tsao | |
| 4,595,666 A | 6/1986 | Ganguli | |
| 4,701,428 A | 10/1987 | Bellussi et al. | |
| 4,713,363 A | 12/1987 | Hucul | |
| 4,793,980 A * | 12/1988 | Torobin | 423/213.5 |
| 4,824,976 A | 4/1989 | Clerici et al. | |
| 4,826,795 A | 5/1989 | Kitson et al. | |
| 4,832,821 A * | 5/1989 | Swan, III | 208/65 |
| 4,832,938 A | 5/1989 | Gosser et al. | |
| 4,937,216 A | 6/1990 | Clerici et al. | |
| 4,937,220 A | 6/1990 | Nickols, Jr. | |
| 4,983,558 A | 1/1991 | Born et al. | |
| 4,999,326 A | 3/1991 | Sikkenga et al. | |
| 5,017,535 A | 5/1991 | Schoonhoven et al. | |
| 5,024,905 A | 6/1991 | Itoh et al. | |
| 5,061,671 A | 10/1991 | Kitson et al. | |
| 5,096,866 A | 3/1992 | Itoh et al. | |
| 5,104,635 A | 4/1992 | Kanada et al. | |
| 5,128,114 A | 7/1992 | Schwartz | |
| 5,132,099 A | 7/1992 | Hiramatsu et al. | |
| 5,132,480 A | 7/1992 | Tsutsui et al. | |
| 5,166,372 A | 11/1992 | Crocco et al. | |
| 5,180,573 A | 1/1993 | Hiramatsu et al. | |
| 5,188,996 A | 2/1993 | Huang et al. | |
| 5,214,168 A | 5/1993 | Zajacek et al. | |
| 5,234,584 A | 8/1993 | Birbara et al. | |
| 5,236,692 A | 8/1993 | Nagashima et al. | |
| 5,320,821 A | 6/1994 | Nagashima et al. | |
| 5,338,531 A | 8/1994 | Chuang et al. | |
| 5,352,645 A | 10/1994 | Schwartz | |
| 5,372,981 A | 12/1994 | Witherspoon | |
| 5,378,450 A | 1/1995 | Tomita et al. | |
| 5,391,531 A | 2/1995 | Ward | |
| 5,399,344 A | 3/1995 | Yang et al. | |
| 5,480,629 A | 1/1996 | Thompson et al. | |
| 5,496,532 A | 3/1996 | Monzen et al. | |
| 5,505,921 A | 4/1996 | Luckoff et al. | |
| 5,583,085 A | 12/1996 | Ward | |
| 5,698,488 A | 12/1997 | Birbara et al. | |
| 5,767,036 A | 6/1998 | Freund et al. | |
| 5,846,895 A | 12/1998 | Gila et al. | |
| 5,846,898 A | 12/1998 | Chuang et al. | |
| 5,851,948 A | 12/1998 | Chuang et al. | |
| 5,859,265 A | 1/1999 | Muller et al. | |
| 5,866,500 A | 2/1999 | Taguchi et al. | 502/326 |
| 5,885,443 A | 3/1999 | Bogdan et al. | 208/138 |
| 5,900,386 A | 5/1999 | Freund et al. | |
| 5,912,367 A | 6/1999 | Chang | |
| 5,925,588 A | 7/1999 | Chuang et al. | |
| 5,961,948 A | 10/1999 | Wanngard | |
| 5,965,101 A | 10/1999 | Goto et al. | |
| 5,972,305 A | 10/1999 | Park et al. | |
| 5,976,486 A | 11/1999 | Thompson et al. | |
| 6,001,762 A | 12/1999 | Harmer et al. | |
| 6,005,155 A | 12/1999 | Sun | |
| 6,040,490 A | 3/2000 | Ichioka et al. | |
| 6,054,507 A | 4/2000 | Funaki et al. | |
| 6,069,286 A | 5/2000 | Wu et al. | |
| 6,090,858 A | 7/2000 | El-Sayed | |
| 6,106,797 A | 8/2000 | Muller et al. | |
| 6,127,307 A | 10/2000 | Muller et al. | |
| 6,159,267 A | 12/2000 | Hampden-Smith | |
| 6,168,775 B1 | 1/2001 | Zhou et al. | |
| 6,194,338 B1 | 2/2001 | Andolfatto et al. | |
| 6,239,054 B1 | 5/2001 | Shukis et al. | |
| 6,284,213 B1 | 9/2001 | Paparatto et al. | |
| 6,331,500 B1 | 12/2001 | Tsuji et al. | |
| 6,387,346 B1 | 5/2002 | Bertsch-Frank et al. | |
| 6,447,743 B1 | 9/2002 | Devic et al. | |
| 6,500,968 B2 | 12/2002 | Zhou et al. | |
| 6,500,969 B1 | 12/2002 | Zhou et al. | |
| 6,518,217 B2 | 2/2003 | Xing et al. | |
| 6,528,683 B1 | 3/2003 | Heidemann et al. | |
| 6,534,440 B2 | 3/2003 | Choudhary et al. | |
| 6,534,661 B1 * | 3/2003 | Zhou et al. | 549/531 |
| 6,551,960 B1 | 4/2003 | Laine et al. | |
| 6,576,214 B2 | 6/2003 | Zhou et al. | |
| 6,630,118 B2 | 10/2003 | Paparatto et al. | |
| 6,635,348 B1 | 10/2003 | Hampden-Smith et al. | |
| 6,649,140 B2 | 11/2003 | Paparatto et al. | |
| 6,676,919 B1 | 1/2004 | Fischer et al. | |
| 6,713,036 B1 | 3/2004 | Vanden Bussche et al. | |
| 6,727,309 B1 | 4/2004 | Paiva et al. | |
| 6,740,615 B2 | 5/2004 | Zhou | |
| 6,746,597 B2 | 6/2004 | Zhou et al. | |
| 6,776,606 B2 | 8/2004 | Haskew | 431/2 |
| 6,782,892 B2 | 8/2004 | Li et al. | |
| 6,888,013 B2 | 5/2005 | Paparatto et al. | |
| 7,011,807 B2 * | 3/2006 | Zhou et al. | 423/584 |
| 7,045,479 B2 * | 5/2006 | Zhou et al. | 502/125 |
| 7,045,481 B1 * | 5/2006 | Parasher et al. | 502/150 |
| 2001/0024634 A1 | 9/2001 | Bertsch-Frank et al. | |
| 2002/0022672 A1 | 2/2002 | Thunhorst et al. | |
| 2003/0010252 A1 | 1/2003 | Arita et al. | |
| 2003/0012686 A1 | 1/2003 | Andresen et al. | |
| 2003/0086853 A1 | 5/2003 | Devic | |
| 2003/0104936 A1 | 6/2003 | Mao et al. | 502/339 |
| 2003/0121364 A1 | 7/2003 | Sun | |
| 2003/0215383 A1 | 11/2003 | Escrig et al. | |
| 2004/0013601 A1 | 1/2004 | Butz et al. | |
| 2004/0037769 A1 | 2/2004 | Paparatto et al. | |
| 2004/0037770 A1 | 2/2004 | Fischer et al. | |
| 2004/0081611 A1 | 4/2004 | Muller et al. | |
| 2004/0087441 A1 * | 5/2004 | Bock et al. | 502/313 |
| 2004/0102648 A1 * | 5/2004 | Borgmeier et al. | 562/546 |
| 2004/0151659 A1 | 8/2004 | Paparatto et al. | |
| 2004/0151660 A1 | 8/2004 | Paparatto et al. | |
| 2004/0184983 A1 | 9/2004 | Paparatto et al. | |
| 2004/0241502 A1 | 12/2004 | Chung et al. | |
| 2005/0014636 A1 | 1/2005 | Zhou et al. | |
| 2006/0102521 A1 | 5/2006 | Zhou et al. | |
| 2006/0243641 A1 | 11/2006 | Zhou et al. | |
| 2008/0045401 A1 | 2/2008 | Zhou et al. | |

FOREIGN PATENT DOCUMENTS

| | | |
|---|---|---|
| EP | 0 978 316 | 2/2000 |
| EP | 1 277 701 | 7/2002 |
| EP | 1 344 747 | 9/2003 |
| JP | 07069605 | 3/1995 |
| JP | WO 98/10863 | 3/1998 |
| JP | 10324507 | 12/1998 |
| JP | 03024794 | 1/2003 |
| WO | WO 00/59635 | 10/2000 |
| WO | WO 01/05501 | 1/2001 |
| WO | WO 02/14217 | 2/2002 |
| WO | WO 02/083550 | 10/2002 |
| WO | WO 02/092501 | 11/2002 |
| WO | WO 02/092502 | 11/2002 |
| WO | WO 03/014014 | 2/2003 |
| WO | WO 2006078352 A2 * | 7/2006 |
| WO | 2007/137028 * | 11/2007 |

OTHER PUBLICATIONS

Li, et al., "Preparation and Charaterization of Multiwalled Carbon Nanotube-Supported Platinum for Cathode Catalysts of Direct Methanol Fuel Cells", *J. Phys. Chem*, B, vol. 107, pp. 6292-6299 (Jun. 6, 2003).

Lordi, et al., "Method for Supporting Platinum on Single-Walled Carbon Nanotubes for a Selective hydrogenation Catalyst", *Chem. Mater.*, vol. 13, pp. 733-737 (Feb. 10, 2001).

Zhou, et al., "Novel Synthesis of Highly Active Pt/C Cathode Electrocatalyst for Direct Methanol Fuel Cell" Chem. Commun. 2003, pp. 394-395.

Zhou, et al. "Preparation and Characterization of Anode Catalysts PtRu/C for Direct Methanol Fuel Cells" Chemical Journal of Chinese Universities, vol. 24, 2003, pp. 885-862.

Scott, et al., "Interaction between ruthenium and molybdenum in RuMo/$Al_2O_3$ catalysts", *Applied Catalysts A: General* 125 (1995) 71-79.

Adesina, "Hydrocarbon synthesis via Fischer-Tropsch reaction: travails and triumphs", *Applied Catalyst A: General* 138 (1996) 345-367.

Aksoylu, et al., "Interaction between Nickel and Molybdenum in Ni-Mo/$Al_2O_3$ catalysts: II CO hydrogenation", *Applied Catalysts A: General* 168(1998) 399-407.

Aksoylu, et al., "Interaction between nickel and molybdenum in Ni-Mo/$Al_2O_3$ catalysts: III. Effect of impregnation strategy", *Applied Catalysts A: General* 183 (1999) 357-364.

Zhu, et al., "Catalytic partial oxidation of methane to synthesis gas over Ni-$CeO_2$", *Applied Catalysts A: General* 208 (2001) 403-417.

Morioka, et al., "Partial oxidation of methane to synthesis gas over supported Ni catalysts prepared from Ni catalysts prepared from Ni-Ca/Al-layered double hydroxide", *Applied Catalysts A: General* 215 (2001) 11-19.

Chu, et al., "The partial oxidation of methane to syngas over the nickel-modified hexaaluminate catalysts $BaNi_y Al_{12-y} O_{19-\delta}$", *Applied Catalysts A: General* 235 (2002) 39-45.

Basile, et al., "Rh-Ni synergy in the catalytic partial oxidation of methane: surface phenomena and catalyst stability", *Catalysis Today* 77 (2002) 215-223.

Te, et al., "Comparative study of Rh/$Al_2O_3$ and Rh-Mo/$Al_2O_3$ catalysts", *Center for Catalytic Science and Technology*, Abstract, Oct. 4, 1994.

Lowenthal, et al., "Surface Chemistry of Rh-Mo/$\gamma$-$Al_2O_3$ : An Analysis of Surface Acidity," *Journal of Catalysis* 156, 96-105 (1995).

Office Action for U.S. Appl. No. 11/435,165, dated Aug. 8, 2007, 13 pgs.

Nashner et al., "Structural Characterization of Carbon-Supported Platinum-Ruthenium Nanoparticles from the Molecular Cluster Precursor $PtRu_5 C(CO)_{16}$", Journal of the American Society, 1997, 119, 7760-7771.

Sun et al., "Monodisperse FePt Nanoparticles and Ferromagnetic FePt Nanycrystal Superlattices", Mar. 17, 2000, Science, vol. 287, pp. 1989-1992.

Bonnemann et al., "Nanoscale collodial metals and alloys stabilized by solvents and surfactants Preparation and use as catalyst precursors", Journal of Organometallic Chemistry 520 (1996), 143-162.

Kim et al., "Preparation and characterization of Au-Ag and Au-Cu alloy nanoparticles in chloroform", Journal of Materials Chemistry, 2003, 13, 1789-1792.

Office Action dated Jan. 9, 2008, cited in U.S. Appl. No. 11/435,165.

Office Action dated Feb. 6, 2008, cited in U.S. Appl. No. 11/435,165.

Office Action dated May 30, 2008, cited in U.S. Appl. No. 11/435,165.

Office Action dated Mar. 27, 2008, cited in U.S. Appl. No. 10/990,616.

Office Action dated Jul. 18, 2008, cited in U.S. Appl. No. 10/990,616.

Office Action dated Mar. 27, 2008, cited in U.S. Appl. No. 11/103,676.

Office Action dated Aug. 13, 2008, cited in U.S. Appl. No. 11/103,676.

Office Action dated Jun. 24, 2008, cited in U.S. Appl. No. 11,435,580.

\* cited by examiner

REFORMING NANOCATALYSTS AND METHOD OF MAKING AND USING SUCH CATALYSTS

CROSS-REFERENCE TO RELATED APPLICATIONS

This application claims the benefit of earlier filed U.S. Provisional Application No. 60/643,836, filed Jan. 14, 2005. The disclosure of the foregoing application is incorporated herein to the extent it relates to reforming catalysts and methods of making such catalysts.

BACKGROUND OF THE INVENTION

1. The Field of the Invention

The present invention relates generally to reforming nanocatalysts and methods for making and using such catalysts. Such reforming catalysts include supported nanocatalyst particles and are used for the reforming of naphtha and formation of BTX.

2. The Relevant Technology

Naphtha is a volatile, flammable liquid mixture of hydrocarbons distilled from petroleum or other fossil fuel sources. Naphtha can be used as a fuel, a solvent, or in making various chemicals. Typically naphtha is a mixture of hydrocarbons that boil between about 65° C. and about 195° C. and is obtained from processing crude oil and heavy oil fractions.

Catalytic naphtha reforming is an important petroleum refining operation. In catalytic naphtha reforming, a catalyst is used to reform the naphtha to make more valuable hydrocarbon products.

For example, a reforming catalyst can be used to increase the octane number of a naphtha mixture, thereby making it more suitable for gasoline blending. The reformed product, or reformate, is one of the two most important contributors to the motor gasoline pool. Octane number gains by catalytic reforming vary depending on the feed quality and the reaction conditions, but typically range between 30 and 70.

Another application of naphtha reforming is the production of benzene, toluene, and xylenes, also known collectively as BTX. These compounds, while useful for increasing octane, also have significant value and uses in various chemical industries. When reforming is optimized to produce benzene, toluene, xylenes, ethyl benzene, and other aromatic compounds, the reforming procedure is called a BTX operation.

An additional benefit of naphtha reforming is the production of hydrogen. Hydrogen is used in many other refining operations, and naphtha reforming is typically the only refining process with a net production of hydrogen.

Catalytic naphtha reforming usually includes a number of different reactions that take place in the vapor phase over a suitable catalyst. Important reforming reactions include: dehydrogenation of naphthenes to produce aromatics, isomerization of linear paraffins to form branched paraffins or iso-paraffins, and dehydrocyclization of paraffins to form aromatics.

Each reaction can be favored by somewhat different reaction conditions and can take place at different catalytic active sites. Some of these reactions, such as dehydrogenation, are catalyzed by metal sites, whereas others, such as isomerization and dehydrocyclization, take place mostly via a bifunctional mechanism, meaning they require both metal and acid catalytic sites.

Undesirable reactions can also occur. Examples of undesirable reactions include coking, which can deactivate the catalyst, and hydrogenolysis, which is a highly exothermic reaction that produces light hydrocarbon gases from larger paraffins.

Hydrocracking is another reaction that can occur during naphtha reforming. Hydrocracking involves the cleavage of a C—C bond, resulting in the formation of lighter paraffins from heavier ones and in ring opening in naphthenes. For some hydrocarbon molecules hydrocracking is desirable, while for others it is not. Nevertheless, it usually occurs to some extent under typical reforming conditions.

Naphtha reforming catalysts are designed to minimize undesired reactions, deactivate slowly, and show high activity and selectivity toward desired products. To achieve these properties, naphtha reforming catalysts are typically made from precious metals such as platinum.

Because current reforming catalysts are made with very expensive metals such as noble metals, there is a need to increase the activity, selectivity and long-term stability of reforming catalysts. While many improvements have been made to reforming catalysts in recent years, there is still a need to further improve the activity, selectivity, and stability of these and other catalysts to reduce the costs of reforming procedures.

BRIEF SUMMARY OF THE INVENTION

The present invention relates to supported reforming catalysts comprising a support and dispersed nanocatalyst particles anchored to the support. Such catalysts are used in the catalytic reforming of naphtha for octane number enhancement and/or for BTX formation. The improved dispersion and anchoring of nanoparticles and/or the improved distribution of catalyst components within the nanocatalyst particles overcome the disadvantages of prior catalysts by providing increased longevity, activity, and/or selectivity.

According to one embodiment, supported reforming catalysts according to the invention catalyst include catalyst particles having a (111) crystal face exposure. Catalysts having a (111) crystal face exposure would be expected to have particular utility in forming aromatics since the catalyst atoms (e.g., Pt) are arranged in a six member ring around a central catalyst atom. Reforming catalysts according to the invention have been shown to have increased ability to enhance octane number and/or form aromatic compounds compared to conventional reforming catalysts, thus supporting this hypothesis. They have also resulted in an increase in net hydrogen production compared to conventional reforming catalysts.

One exemplary embodiment for forming a supported reforming catalyst having well-dispersed nanocatalyst particles anchored to the support includes: (i) providing a plurality of catalyst atoms; (ii) providing a dispersing agent comprising a plurality of organic molecules that have at least one functional group capable of binding to the catalyst atoms; (iii) reacting the dispersing agent with the catalyst atoms to form a catalyst complex capable of forming a bond or otherwise adhering to a support; (iv) attaching the catalyst complex onto a support to form an intermediate catalyst composition in which the catalyst atoms are in a non-zero oxidation state; and (v) heat treating the intermediate catalyst composition at a temperature above about 50° C. while the catalyst atoms are in the non-zero oxidation state so as to form a supported catalyst having well-dispersed nanocatalyst particles having a size less than about 100 nm anchored to the support and in order to volatilize off at least one unwanted component.

Reforming catalysts made according to the foregoing method include catalyst particles having catalyst metal atoms in a non-zero oxidation state, at least initially. Maintaining the catalyst metal atoms in a non-zero oxidation state during heat treating maintains a stronger bond between the catalyst metal atoms and the dispersing agent compared to heat treating a supported catalyst having catalyst metal atoms in the ground (or zero oxidation) state. This better inhibits agglomeration of the tiny catalyst nanoparticles, which, in turn, yields a supported catalyst having a better dispersion of nanocatalyst particles and higher catalytic activity. Such catalysts are typically reduced to a zero oxidation state prior to or during use.

The reforming catalysts of the present invention are useful in promoting reforming reactions with naphtha, for gasoline blending and/or BTX formation. Both single- and multicomponent supported nanocatalysts according to the invention can be used for naphtha reforming. Examples of useful single component reforming catalysts include platinum (Pt), palladium (Pd), rhodium (Rh), and iridium (Ir). Multicomponent reforming catalysts may include two or more of the foregoing, or they may include one or more of the foregoing as the primary catalyst component in combination with at least one secondary catalyst component selected from the group consisting of tin (Sn), rhenium (Re), germanium (Ge), lead (Pb), arsenic (As), antimony (Sb), tungsten (W), osmium (Os), cadmium (Cd), indium (In), titanium (Ti), phosphorus (P), gallium (Ga), ruthenium (Ru), calcium (Ca), magnesium (Mg), barium (Ba), and strontium (Sr). In some cases, the secondary catalyst component(s) increase catalytic activity, promote other useful reactions, and/or help prevent catalyst deactivation by, e.g., coking.

According to one embodiment, multicomponent (e.g., bimetallic) supported catalysts can be made in which individual catalyst nanoparticles include a mixture (e.g., an alloy) of different metals or components. In general, forming nanoparticles comprising an alloy or combination of two or more different components is highly disfavored from a thermodynamic standpoint because of (i) the high temperatures typically necessary to cause dissimilar metals to join together in a single nanoparticle and (ii) because such high temperatures typically cause nanoparticles to agglomerate together to form larger (e.g., micron- or larger-sized particles). Nevertheless, use of the dispersing agent reduces or eliminates same-component attractions that are normally present during catalyst formation and causes a more random distribution of metals within the nanocatalyst particles. Upon formation of the nanocatalyst particles, the distribution of each catalyst component in the particle is thus more random and uniform.

It should be understood that multicomponent reforming catalysts can be made using other processes. For example, methods for manufacturing supported multicomponent nanocatalyst particles are disclosed in copending U.S. application Ser. No. 10/990,616, filed Nov. 17, 2004, and entitled "MULTICOMPONENT NANOPARTICLES FORMED USING A DISPERSING AGENT", which was previously incorporated by reference. The foregoing application discloses methods of manufacturing a supported multicomponent metal catalyst in a manner than does not require a heat treatment step.

In one embodiment, the nanocatalyst particles are anchored to a substrate such as alumina or silica. The dispersing agent acts as an anchor to bind the catalyst nanoparticles to the substrate. Anchoring helps prevent particles agglomeration during use and also reduces leaching of the nanoparticles from the support material. Thus, the inventive reforming catalysts have improved catalytic activity and a higher resistance to deactivation.

It is believed that the controlled distribution of primary and secondary catalyst components is responsible in part for the catalyst's high activity and resistance to deactivation. For example, tin, rhenium, and iridium have the ability to improve catalyst activity and prevent undesired reactions, such as coking. These beneficial properties are typically promoted when the different catalyst atoms are intimately combined, mixed, interspersed, decorated, or alloyed together.

The reforming catalysts according to the present invention can significantly reduce the cost of naphtha reforming operations. The higher activity of the catalysts means that higher octane number and/or aromatic products can be obtained with the same catalyst loadings. Alternatively, catalyst loading can be decreased while maintaining a desired catalyst activity, thereby decreasing catalyst costs. Increased catalyst lifetime can also reduce the cost of a reforming process since regeneration and/or replacement of the catalyst in a reforming operation may be performed less frequently.

These and other advantages and features of the present invention will become more fully apparent from the following description and appended claims as set forth hereinafter.

DETAILED DESCRIPTION OF EXEMPLARY EMBODIMENTS

I. Introduction

The present invention is directed to the manufacture of novel reforming nanocatalysts useful for reforming naphtha for octane number enhancement and for BTX formation. According to one aspect of the invention, novel reforming nanocatalysts are manufactured in a manner so as to have well-dispersed nanocatalyst particles anchored to a support.

In an exemplary embodiment, a dispersing agent is used that bonds to the catalyst components and determines, at least in part, the molecular arrangement of the catalyst, components. A dispersing agent can be used to ensure that two or more different catalyst components are distributed between nanocatalyst particles in a desired distribution. These nanocatalyst particles can be used to form supported reforming catalysts with improved catalytic activity and increased longevity For purposes of disclosure and the appended claims, the term "nanoparticles" or "nano-sized particles," means particles with a diameter of less than about 100 nanometers (nm).

The term "minority component" means the component in a multicomponent nanocatalyt particle with the lesser concentration within the particle. In the case where two or more components have essentially the same concentration within the particle, evidenced by the fact that the determination of a minority is statistically impractical, then either-component is considered to be the minority component.

For purposes of disclosure and the appended claims, the term "Number Ratio" or "NR" is equal to $N_A/N_B$ where $N_A$ is the number (or moles) of atoms of a more numerous component A in a given nanoparticle or set of nanoparticles, and $N_B$ is the number (or moles) of atoms of a less numerous component B in the nanoparticle or set of nanoparticles. For a particular nanoparticle i, NR can be expressed as the specific value ($NR_i$). The average NR for all of the nanoparticles in a given set of nanoparticles is expressed as the average value ($NR_{avg}$).

In most cases, the individual NR values corresponding to the various particles within a given sample or set of nanoparticles do not equal a single discrete value but fall within a range of NR values (i.e., the "Range of NR"). The Range of NR for a given sample of set of nanoparticles having at least two different nanoparticle components within each particle has an upper value $NR_{max}$ and a lower value $NR_{min}$.

II. Components Used to Manufacture Supported Reforming Nanocatalysts and Intermediates Supported reforming nanocatalysts according to the invention are typically manufactured using one or more different types of catalyst atoms, a dispersing agent, a support, and one or more solvents. As will be discussed more fully below, one or more catalyst metals or components are initially reacted with a dispersing agent to form a catalyst complex, typically using one or more solvents to form a solution, colloid or suspension comprising the solvent, catalyst complex, and optionally excess dispersion agent and/or catalyst component(s). The catalyst complex is impregnated onto or otherwise attached to a support to form an intermediate catalyst composition in which the catalyst atoms have a non-zero oxidation state. According to one embodiment, the intermediate catalyst composition is heat treated while the catalyst atoms are maintained in a non-zero oxidation state so as to form a supported catalyst having well-dispersed nanocatalyst particles having a size less than about 100 nm anchored to the support. In other embodiments, reforming catalysts (including multicomponent catalysts) according to the invention can be manufactured without a heat treatment step.

A. Catalyst Atoms

The catalyst atoms that form the catalyst nanoparticles of the present invention can include any metal, or combination of one or more metals or other elements, that exhibit catalytic reforming activity. Examples of useful catalyst atoms include one or more noble metals, which include platinum, palladium, iridium, gold, osmium, ruthenium, rhodium, and rhenium. Examples of other catalyst atoms include one or more base transition metals, rare earth metals, alkaline earth metals, alkali metals, and even non metals, which can be used alone or complexed or alloyed with other catalyst materials.

Platinum (Pt) is particularly useful as the primary catalyst component in reforming catalysts. Though less preferred, palladium (Pd), rhodium (Rh) and iridium (Ir) may also be used as the primary catalyst component, or they may be used in combination with platinum as a secondary catalyst component. Tin (Sn) and rhenium (Re) can be beneficially used in combination with platinum as a secondary catalyst component, as can be various other components such as germanium (Ge), lead (Pb), arsenic (As), antimony (Sb), tungsten (W), osmium (Os), cadmium (Cd), indium (In), titanium (Ti), phosphorus (P), gallium (Ga), ruthenium (Ru), calcium (Ca), magnesium (Mg), barium (Ba), and strontium (Sr).

As described below, the catalyst atoms are added to an appropriate solvent or carrier to form a solution or suspension. Catalyst atoms can be added to a solution in elemental (e.g., metallic) form, or added in ionic form. Typically, the catalyst atoms are added in ionic form so as to more readily dissolve or disperse within the solvent or carrier. Examples of suitable ionic forms include metal halides, nitrates or other appropriate salts that are readily soluble in a solvent or carrier. Specific examples include metal phosphates, sulfates, tungstates, acetates, citrates, and glycolates.

Metal components that are compounds themselves, such as oxides, can be added to a liquid medium in the appropriate compound form, or may be in a different chemical form that is converted to the appropriate chemical form during catalyst formation.

B. Dispersing Agents

The dispersing agent is selected to promote the formation of a catalyst complex that is able to bond or adhere to a support. Iii addition, the dispersing agent is selected to yield nanocatalyst particles that have a desired stability, size and/or uniformity. Dispersing agents within the scope of the invention include a variety of small organic molecules, as well as-polymers and oligomers. Exemplary dispersing agents are able to interact and complex with catalyst atoms that are dissolved or dispersed within an appropriate solvent or carrier through various mechanisms, including ionic bonding, covalent bonding, Van der Waals interaction/bonding, or hydrogen-bonding.

To provide bonding between the dispersing agent and the catalyst atoms, the dispersing agent includes one or more appropriate functional groups. Suitable functional groups for complexing the dispersing agent with the catalyst atoms include one or more of a hydroxyl, a carboxyl, an amine, a thiol, an ester, an amide, a ketone, an aldehyde, a sulfonic acid, an acyl halide, a sulfonyl halide, and combinations of these. The dispersing agent can be monofunctional, bifunctional, or polyfunctional. In the case where the catalyst atoms are metals, the catalyst complex formed between the catalyst atoms and dispersing agent is typically an organometallic complex.

Examples of suitable monofunctional dispersing agents include alcohols such as ethanol and propanol and carboxylic acids such as formic acid and acetic acid. Useful bifunctional dispersing agents include diacids such as oxalic acid, malonic acid, maleic acid, and the like; dialcohols such as ethylene glycol, propylene glycol, 1,3-propanediol, and the like; and hydroxy acids such as glycolic acid, lactic acid, and the like. Useful polyfunctional dispersing agents include sugars such as glucose, polyfunctional carboxylic acids such as citric acid, hydroxy diacids, and the like.

Other useful dispersing agents include ethanolamine, mercaptoethanol, 2-mercaptoacetate, amino acids such as glycine and alanine, sulfonic acids such as sulfobenzyl alcohol and sulfobenzoic acid, and other sulfobenzyl compounds having amino and thiol functional groups.

Dispersing agents according to the invention also include polymers or oligomers, which can be natural or synthetic. In the case where the dispersing agent is an oligomer or polymer, the molecular, weight, measured in number average, is preferably in a range from about 300 to about 15,000 Daltons, more preferably in a range of about 600 to about 6000 Daltons. However, it is recognized that even high molecular weight polymers, i.e., greater than 15,000, can be used as the dispersing agent if they are readily soluble in solvents, carriers or vehicles and can complex with the catalyst atoms.

The molecular weight of the polymer or oligomer molecules may be selected to yield a dispersing agent having a desired number of functional groups per molecule. In general, the number of functional groups may range from 4 to 200 functional groups per molecule, preferably from about 8 to about 80 functional groups, and more preferably from about 10 to about 20 functional groups. In many cases, the number of functional groups within a polymer or oligomer at least approximately corresponds to the number of repeating units.

Suitable polymers and oligomers within the scope of the invention include, but are not limited to, polyacrylic acid, polyacrylates, polyvinylbenzoates, polyvinyl sulfate, polyvinyl sulfonates, including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

It may be advantageous to provide aft excess of the dispersing agent so as to provide an excess of functional groups relative to the number of catalyst atoms. Including an excess of functional groups helps to ensure that all or substantially all of the catalyst atoms are complexed by the dispersing agent. Providing an excess of dispersing agent can also help to ensure the availability of functional groups for bonding the catalyst to a substrate where such bonding is desired.

In addition to the characteristics of the dispersing agent, it can also be advantageous to control the molar ratio of dispersing agent functional groups to catalyst atoms. For example, in the case of a divalent metal ion, two molar equivalents of a monovalent functional group would be necessary to provide the theoretical stoichiometric ratio. It may be desirable to provide an excess of dispersing agent functional groups to (1) ensure that all or substantially all of the catalyst atoms are complexed, (2) bond the nanoparticles to a support, and (3) help keep the nanoparticles segregated so that they do not clump or agglomerate together. In general, it will be preferable to include a molar ratio of dispersing agent functional groups to catalyst atoms in a range of about 1000:1 to about 1:1000 and more preferably in a range of about 50:1 to about 1:50.

The dispersing agents of the present invention allow for the formation of very small and uniform nanoparticles. In a preferred embodiment, the catalyst nanoparticles formed in the presence of the dispersing agent are preferably less than about 100 nm, more preferably less than about 10 nm, even more preferably less than about 6 nm, more especially preferably less than about 5 nm, and most preferably less than about 4 nm.

As discussed below, the nanocatalyst particles are supported on a support surface. It is believed that when a support material is added to a suspension or solution of catalyst complex, the dispersing agent acts to uniformly disperse the complexed catalyst atoms and/or suspended nanoparticles onto the support material. The dispersing agent can be selected such that it acts as an anchor between the nanocatalyst particles and a support material, which is described more fully below. During and after formation of the nanocatalyst particles, the dispersing agent can act as an anchoring agent to secure the nanoparticle to a substrate. Preferably, the substrate has a plurality of hydroxyl or other functional groups on the surface thereof which are able to chemically bond to one or more functional groups of the dispersing agent, such as by a condensation reaction. One or more additional functional groups of the dispersing agent are also bonded to one or more atoms within the nanoparticle, thereby anchoring the nanoparticle to the substrate.

While the dispersing agent has the ability to inhibit agglomeration without anchoring, chemically bonding the nanoparticle to the substrate surface through the dispersing agent is an additional and particularly effective mechanism for preventing agglomeration.

According to one embodiment, the dispersing agent is selected to yield reforming catalysts having a (111) crystal face exposure. In general, small molecule dispersing agents (e.g., citric acid, glycolic acid, lactic acid, and ethylene glycol) and branched oligomers or polymers (e.g., branched polyacrylic acid) have been found to promote the formation of supported catalyst particles having a (111) crystal face exposure.

C. Catalyst Complexes

The term "catalyst complex" refers to a solution, suspension, or other composition in which a bond or coordination complex is formed between a dispersing agent and one or more different types of catalyst atoms. The "bond" between the dispersing agent and catalyst atoms can be ionic covalent, electrostatic, or it can involve other bonding forces such as coordination with nonbonding electrons, Van der Waals forces, and the like.

Catalyst complexes include one or more different types of catalyst atoms complexed with one or more different types of dispersing agents. In some cases, the catalyst complex comprises individual catalyst atoms bonded to the dispersing agent in solution or suspension within a solvent. In such cases, the catalyst particles are formed after attaching the catalyst complex to a support to form an intermediate catalyst composition and then subjecting the intermediate catalyst composition to one or more appropriate processing steps to yield the catalyst particles. In other cases, the catalyst complex includes or forms the nanocatalyst particles in suspension prior to applying the catalyst complex to the support.

It is also within the scope of the invention to remove the solvent to yield a dried catalyst complex that can be reconstituted at a later time to yield a solution or suspension that can be impregnated or applied to a support.

The catalyst complex may comprise an organometallic compound, either alone or in combination with another or additional dispersing agent. In an exemplary embodiment, the organometallic compound may have the general formula:

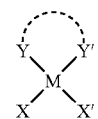

wherein:

a) X and X' are chosen independently of one another from a group including R, OR, OC(=O)R, halogen atoms and combinations of these, where R stands for an alkyl or aryl group. Halogen atoms are preferred.

b) Y and Y' are electron-donating atoms, such as O, N, P, S, and others. Y and Y' may belong to a single coordinated compound or may be part of independently coordinated ligands.

According to one embodiment, the metal center of the organometallic complex can be platinum, another noble metal, and/or other metal having, desired catalytic activity.

D. Solvents and Carriers

A solvent or carrier can be used as a vehicle for the combining of the catalyst atoms (typically in the form of an ionic salt) and/or the dispersing agent. The solvent used to make the inventive precursor compositions may be an organic solvent, water or a combination thereof. Organic solvents that can be used include alcohols, ethers, glycols, ketones, aldehydes, nitrites, and the like.

Preferred solvents are liquids with sufficient polarity to dissolve the metal salts. These preferred solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the liquid mixture. For example, acids or bases may be added to adjust the pH of the mixture. Surfactants may be added to adjust the, surface tension of the mixture, or to stabilize the nanoparticles.

The solvent for the nanoparticle components may be a neat solvent, but it is preferable to use an acidic solution, as acids aid in the dissolution of the nanoparticle components. The solution may be acidified with any suitable acid, including organic and inorganic acids. Preferred acids are mineral acids such as sulfuric, phosphoric, hydrochloric, and the like, or combinations thereof. While it is possible to use an acid in a wide range of concentrations, relatively dilute solutions generally accomplish the desired solubility enhancement. More-over, concentrated acid solutions may present added hazard and expense. Thus, dilute acid solutions are currently preferred.

E. Supports and Support Materials

The nanocatalyst particles are typically formed on or applied to a solid separate solid material to yield a supported reforming catalyst. The solid support material may be organic or inorganic and can be chemically inert in the chemical reaction environment or serve a catalytic function complementary to the function of the catalyst particles. In the case where the reforming conditions involve higher temperatures, the support will preferably comprise an inorganic material.

Any solid support material known to those skilled in the art as useful catalyst particle supports can be used as supports for the nanocatalyst particles of this invention. These supports may be in a variety of physical forms. They may be either porous or non-porous. They may be 3-dimensional structures such as a powder, granule, tablet, extrudates, or other 3-dimensional structure. Supports may also be in the form of 2-dimensional structures, such as films, membranes, coatings, or other mainly 2-dimensional structures. It is even conceivable for the support to be a 1-dimensional structure, such as ultra-thin fibers and filaments In a preferred embodiment, the reforming catalyst support comprises a porous inorganic material. These include, but are not limited to, alumina, silica, silica gel, titania, kieselguhr, diatomaceous earth, bentonite, clay, zirconia, magnesia, as well as the oxides of various other metals, alone or in combination. They also include porous solids such as zeolites, natural or synthetic, and related materials, which have ordered or quasi-ordered pore structures. In the case where porous solids are used as the support material, it is preferred that the surface area of the support be at least 20 m$^2$/g, and more preferably more than 50 m$^2$/g.

Another useful class of supports include carbon-based materials, such as carbon black, activated carbon, graphite, fluoridated carbon, and the like. Other useful classes of support materials include organic solids, such as polymers and metals and metal alloys.

It may be advantageous to treat the support material with a halogen, an example of which is chlorine, in order to give the catalyst acidity. Alternatively or in addition, it may be advantageous for the support to be sulfided.

The nanocatalyst particles can be deposited in a wide range of loadings on the support material. The loading can range from 0.01% to 90% by weight of the total weight of the supported catalyst. The preferred loading will depend on the specific reforming application involved.

III. Reforming Catalysts

The reforming catalysts according to the invention include well-dispersed nanocatalytic particles anchored to an appropriated support material. Reforming catalysts suitable for the reforming of naphtha for octane number enhancement or BTX formation may include one type of catalyst metal or component, or they may be multicomponent catalysts. One method of manufacturing catalysts, as discussed more fully below, is particularly useful in the manufacture of reforming catalysts having multicomponent nanocatalyst particles comprising a plurality of different metals.

Exemplary reforming catalysts comprise multicomponent nanocatalyst particles that include one or more of platinum, palladium, rhodium, or iridium as the primary catalyst component in combination with a secondary reforming catalyst component, preferably one, or more of tin or rhenium. Other secondary reforming catalyst components include one or more of germanium, lead, arsenic, antimony, tungsten, osmium, cadmium, indium, titanium, phosphorus, gallium, ruthenium, calcium, magnesium, barium, and strontium. In the case where a multicomponent reforming catalyst is provided, the nanocatalyst particles will preferably have a desired distribution of catalyst atoms.

In the case of a multicomponent reforming catalyst, at least about 50% of the nanocatalyst particles in the reforming catalyst will preferably include two or more of the nanocatalyst components. More preferably, at least about 75% of the nanocatalyst particles within the reforming catalyst include two or more of the nanocatalyst components, even more preferably at least about 85% of the nanocatalyst particles include two or more of the nanocatalyst components, and most preferably at least about 95% of the nanocatalyst particles within the reforming catalyst include two or more of the nanocatalyst components. It is within the scope of the invention for at least about 99% of the nanocatalyst particles within a. reforming catalyst according to the invention to include two or more of the nanocatalyst components.

Because a substantial proportion of multicomponent nanocatalyst particles prepared according to the invention include two or more nanocatalyst components, the benefits derived from having the catalyst components in a single multicomponent particle are more uniformly distributed throughout the nanocatalyst particles compared to heterogeneous mixtures of single component catalyst particles. Consequently, the overall catalyst has an increased display of these beneficial properties.

According to another aspect of the invention, the degree of distribution of the two or more components between nanoparticles prepared according to the invention can be measured by the Number Ratio (NR) or Range of NR for a given set of nanoparticles having two or more components. The Number Ratio=$N_A/N_B$, where $N_A$ is the number (or moles) of atoms of a more numerous component A within a nanoparticle or set of nanoparticles according to the invention, and $N_B$ is the number (or moles) of atoms of a less numerous component B within the nanoparticle or set of nanoparticles. The value of NR can be expressed as an average value ($NR_{avg}$) for all of the nanoparticles in a given set or as the specific value ($NR_i$) for a particular nanoparticle i.

In an ideal case, the value $NR_i$ for each nanoparticle i in a given set of inventive nanoparticles equals $NR_{avg}$. In this case, each particle i has an equal distribution of components A and B. The present invention also contemplates controlling the dispersion of components in bi- or multicomponent nanoparticles such that the Range of NR values for all of the nanoparticles in a particular sample is within a desired range. The Range of NR has an upper value $NR_{max}$ and a lower value $NR_{min}$. As $NR_{max}$ and $NR_{min}$ deviate less from $NR_{avg}$, the Range of NR becomes narrower, which indicates that the nanoparticles are more uniform.

In a preferred, embodiment, the value of $NR_{max}$ does not exceed about 5 times: the value of $NR_{avg}$, more preferably does not exceed about 3 times the value of $NR_{avg}$, and most preferably does not exceed about 2 times the value of $NR_{avg}$.

Conversely, the value of $NR_{min}$ is preferably at least about 0.2 times the value of $NR_{avg}$, more preferably at least about 0.33 times the value of $NR_{avg}$, and most preferably at least about 0.5 times the value of $NR_{avg}$.

Given the foregoing, the Range of NR is therefore preferably about 0.2 to about 5 times the value of $NR_{avg}$, more preferably about 0.33 to about 3 times the value of $NR_{avg}$, and most preferably about 0.5 to about 2 times the value of $NR_{avg}$. It will be appreciated that the foregoing ranges do not count "outliers" (i.e., particles that do not form correctly and that excessively deviate from $NR_{avg}$ as to be outside the Range of NR). Whereas the NR of the "outliers" may in some cases count toward the $NR_{avg}$, they do not fall within the "Range of NR" by definition.

In a preferred embodiment, at least about 50% of the individual nanoparticles in a given reforming catalyst will have an $NR_i$ within the Range of NR. More preferably, at least about 75% of the individual nanoparticles within the catalyst will have an $NR_i$ within the Range of NR, even more preferably at least about 85% of the individual nanoparticles within the catalyst will have an $NR_i$ within the Range of NR, and most preferably at least about 95% of the individual nanoparticles within the catalyst will have an $NR_i$ within the Range of NR. It is within the scope of the invention for at least about 99% of the individual nanoparticles within a reforming catalyst according to the invention to have an $NR_i$ within the Range of NR.

In contrast to the relatively narrow Range of NR for nanoparticles made according to the present, invention, the nanoparticles in the prior art have very wide Ranges of $NR_i$, in some cases ranging from zero to infinity, indicating that some particles have essentially none of one component, and other particles have essentially none of the other component(s).

The following two simple numerical examples provide non-limiting examples of nanocatalyst particles of the present invention having desired Ranges of NR. Consider a case where component B comprises 1% of a bimetallic nanoparticle mixture, and component A comprises the balance in a given set of nanoparticles. In this, case the $NR_{avg}$ for the set of nanoparticles is approximately 100. The preferred Range of NR for the set nanoparticles is thus 20 to 500, which translates to a range of 0.2% to 5% of component B in the individual nanoparticles that contain both components. The more preferred range for NR is 33 to 300, translating to a composition range of 0.33% to 3% of component B in the individual nanoparticles that contain both components. The most preferred range for $NR_i$ is 50 to 200, or a composition range of 0.5% to 2% component B in the individual nanoparticles that contain both components.

In a second simple numerical example, consider a case where component A and component B are each present in equal quantities of 50% of the total, such that the overall $NR_{avg}$ is 1. In this case, the preferred range of $NR_i$ is 0.2 to 5, corresponding to a composition range of 16% to 83% of component B in the individual nanoparticles that contain both components. The more preferred: range of $NR_i$ is 0.33 to 3, corresponding to a composition range of 25% to 75% component B in the individual nanoparticles that contain both components. Finally, the most preferred range of $NR_i$ is 0.5 to 2, or a composition range of 33% to 67% component B in the individual nanoparticles that contain both components.

As discussed above, the dispersing agents of the present invention are used to provide the desired dispersion and uniformity that is characteristic of the nanocatalyst particles of the present invention. Using the dispersing agents according to the present invention, the above-mentioned uniformity as defined by NR can be obtained.

Typically, the dispersing agent remains as a constituent of the reforming catalyst (i.e., as an anchoring agent that anchors the nanocatalyst particles to the support). The inventors of the present invention have found that characteristic features attributable to the dispersing agent can be present in the final nanocatalyst product, indicating that the dispersing agent persists beyond the nanocatalyst preparation steps.

While it is possible for the multicomponent nanoparticles to contain a true multicomponent compound or crystal structure containing all components, this is not required. In one embodiment, each nanoparticle can be composed of a mixture of components regardless of how they are chemically combined. The components can be present as relatively isolated atoms, or as small atomic clusters. They can also be present as amorphous particles. The components can also be present as crystallites, including alloys. Component crystals can have relatively random crystal face exposures, or they can have a controlled or selective exposure of particular crystal faces.

The uniformity made possible by using a dispersing agent yields improved reforming catalyst properties. Many properties of multicomponent reforming catalysts, such as longevity, depend on the proximity of the two components, such as platinum and tin. The substantially uniform distribution of components during catalyst preparation provides a greater possibility for these different components to come into proximity with one another to provide the desired functionality or property to the catalyst in its final form.

The dispersing agent also makes it possible to select very precise ratios of components by controlling the average percent composition. Because the individual multicomponent catalyst particles have a percent composition that varies very little from the average composition, the percent composition of the individual nanoparticles can be more precisely controlled by adjusting the starting materials to control the average percent composition.

Catalysts having a (111) crystal face exposure would be expected to have particular utility in forming aromatics since the catalyst atoms (e.g., Pt) are arranged in a six member ring around a central catalyst atom. Reforming catalysts according to the invention have been shown to have increased ability to enhance octane number and/or form aromatic compounds compared to conventional reforming catalysts, thus supporting this hypothesis. They have also resulted in an increase in net hydrogen production compared to conventional reforming catalysts.

IV. Exemplary Methods of Making Reforming Catalysts

Exemplary methods for manufacturing supported reforming catalysts according to the invention can be broadly summarized as follows. First, one or more types of catalyst atoms and one or more types of dispersing agents are selected. Second, the catalyst atoms (e.g., metals or other components) and the dispersing agent are reacted or combined together to form catalyst complexes. Third, the catalyst complexes are impregnated onto or otherwise attached to a support material.

According to one embodiment, the reforming catalyst is further heat treated to activate the catalyst or prepare it for use in a reforming process. This method is useful in manufacturing both mono-component and multicomponent reforming catalysts.

According to another embodiment, multicomponent reforming catalysts can be manufactured according to methods disclosed in U.S. application Ser. No. 10/990,616, filed Nov. 17, 2004, and entitled "MULTICOMPONENT NANOPARTICLES FORMED USING A DISPERSING AGENT", which was previously incorporated by reference.

Reforming catalysts according to the invention can be manufactured with or without a heat treatment process. The heat treatment process can be performed before of after reducing the catalyst atoms from a non-zero oxidation state to a zero oxidation state.

The catalyst complex made during the second step outlined above is generally formed by first dissolving the catalyst atoms and dispersing agent in an appropriate solvent or carrier and allowing the catalyst atoms to recombine as the catalyst complex so as to form a solution or suspension. In one embodiment, dispersed nanocatalyst particles form in the suspension. In an alternative embodiment, the dispersing agent facilitates the formation of nanocatalyst particles when disposed on a support surface in one or more subsequent steps.

The catalyst atoms can be provided in any form so as to be soluble or dispersible in the solvent or carrier that is used to form the catalyst complex. For example, catalyst atoms can be provided as metal salts that are readily dissolvable in the solvent or carrier. It may be advantageous to use metal chlorides and nitrates, since metal chlorides and nitrates are typically more soluble than other metal salts.

Catalyst atoms can be added to the solvent or carrier singly or in combination to provide final nanocatalyst particles that comprise a mixture of various types of catalyst, atoms. For example, a platinum/tin reforming catalyst can be formed by first forming a precursor solution of platinum and a precursor solution of tin and then combining the precursor solutions. In general, the composition of the final nanocatalyst particles will be determined by the types of catalyst atoms added to the precursor solution. Therefore, control of the amounts of metal salts added to the precursor solution provides a convenient method to control the relative concentrations of different types of catalyst atoms in the final nanocatalyst particles.

The dispersing agent is added to the solvent or carrier in a manner so as to facilitate association of the dispersing agent with the catalyst atoms in order to form the catalyst complex. Some dispersing agents may themselves be soluble in the solvent or carrier. In the case of dispersing agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex that may be soluble or which may form a suspension within the solvent or carrier.

One aspect of the invention is that very small nanocatalyst particles can be controllably formed. The inventors believe that the relative amounts (or ratio) of dispersing agent to catalyst atoms may play a factor in determining the size of the resulting catalyst nanoparticles. In general, providing a stoichiometric excess of dispersing agent helps reduce particle agglomeration, thereby also generally reducing the size of the nanoparticles.

The catalyst complex is then impregnated into or otherwise applied to a support material to yield an intermediate catalyst composition. In one embodiment, the catalyst complex solution or suspension is physically contacted with a solid support. Contacting the catalyst complex with the solid support is typically accomplished by means of an appropriate solvent or carrier within the catalyst complex solution in order to apply or impregnate the catalyst complex onto the support surface to yield the intermediate catalyst composition.

Depending on the physical form of the solid support, the process of contacting or applying the catalyst complex to the support may be accomplished by a variety of methods. For example, the support may be submerged or dipped into a solution or suspension comprising a solvent or carrier and the catalyst complex. Alternatively, the solution or suspension may be sprayed, poured, painted, or otherwise applied to the support, such as by incipient wetness impregnation. Thereafter, the solvent or carrier is removed, optionally in connection with a reaction step that causes the dispersing agent to become chemically bonded or adhered to the support. Either way, the process yields an intermediate catalyst composition.

According to one embodiment, the intermediate catalyst composition is heat treated to further activate or prepare the supported catalyst atoms or particles for use in the catalytic reforming of naphtha for octane number enhancement and/or BTX formation. It has been found that, in some cases, subjecting the nanocatalyst particles to a heat treatment process before using the reforming catalyst causes the catalyst to be more active initially. In one embodiment, the heat treatment is performed to volatilize unwanted molecules from the nanocatalyst particles. Heat treating can also be performed to increase the anchoring of the nanocatalyst particles to the support material. For example, in a naphtha-reforming catalyst, progressively heating to 50° C. can improve the bonding between the nanocatalyst particles and a support material such as alumina or silica. Heat treatment can cause initial formation of nanocatalyst particles from individual complexed atoms in the case where nanoparticles are not formed in suspension prior to applying the catalyst complex to the support material.

In an exemplary embodiment, the heat treatment process is carried out in an inert or oxidizing environment and with the catalyst atoms at least initially in a non-zero oxidation state. It is believed, at least in some cases, that reducing the catalyst atoms to a zero oxidation state prior to heat treating can weaken the interaction between the catalyst atoms and the dispersing agent and cause unwanted agglomeration of the nanocatalyst particles in some cases. In the non-zero oxidation state, the catalyst atoms form a much stronger bond to the dispersing agent because of the charge on the catalyst atom. Where the heat treating process causes some reduction of the catalyst atoms, performing the heat treatment process in an inert or oxidizing atmosphere helps maintain the catalyst atoms in the non-zero oxidation state longer than if the treatment were carried out in a reducing environment, such as $H_2$.

Where the nanocatalyst particles are multicomponent nanoparticles, heat treating in the nonzero oxidation state may improve the distribution of components between nanocatalyst particles. Maintaining a stronger bond between the dispersing agent and the different nanoparticle components reduces same-component attractions. Reducing same-component attractions allows more random distributions of the different catalyst atoms between nanoparticles and/or prevents same-component attractions from destroying distributions already present in the catalyst nanoparticles before the heat treating step is performed. Even in one-component catalyst systems, heat treating the reforming catalyst while maintaining the catalyst atoms in a non-zero oxidation state can help prevent unwanted agglomeration of the nanocatalyst particles at the higher temperatures associated with the heat treatment process.

The heat treating process of the present invention is preferably carried out at a temperature in a range of about 50° C. to about 600° C., more preferably in a range of about 100° C. to about 500° C., and most preferably in a range of about 150° C. to about 400° C. The duration of the heat treatment process is preferably in a range of about 5 minutes to about 24 hours, more preferably in a range of about 30 minutes to about 12 hours, and most preferably in a range of about 1 hour to about 6 hours. A preferred inert environment for performing the heat treating step includes $N_2$.

One advantageous feature of heat treating the reforming catalyst while maintaining the metal catalyst particles in a non-zero oxidation state is that it does not degrade the nanoparticles or reduce catalytic activity. The dispersing agent provides added stability that helps prevent destroying or agglomeration of the nanoparticles due to the strong interaction between the dispersing agent and catalyst atoms in a non-zero oxidation state.

According to one embodiment, a partial reducing step can be performed prior to heat treating to partially reduce the catalyst atoms. In this embodiment, the reducing step does not reduce the catalyst atoms to the zero oxidation state; rather, the catalyst atoms are only partially reduced (i.e., from a higher to a lower non-zero oxidation state). Typically, the catalyst atoms are only partially reduced if the reduction step is carried out at a sufficiently low temperature. In an exemplary embodiment, platinum catalyst atoms can be partially reduced by heating the nanocatalyst particles to a temperature less than about 100° C. in the presence of $H_2$.

Once the heat treating process is complete, it may be desirable to perform a high temperature reduction, step. As described below, reduction can be performed in a reforming reactor (e.g., the naphtha itself can act as a reducing agent during catalytic dehydrogenation). Performing the reductions, process after the aforementioned heat treatment process is less likely to affect the dispersion and/or distribution of the catalyst atoms. It is believed that heat treating the catalyst atoms while in a non-zero oxidation state forms better anchored catalyst particles that are better stabilized when exposed to subsequent reduction conditions.

If desired, the catalyst nanoparticles can be reduced prior to using the reforming catalyst by using a reducing procedure (e.g., hydrogenation). Hydrogen is one preferred reducing agent. Instead of, or in addition to, using hydrogen as the reducing agent, a variety of other reducing agents may be used, including but not limited to, lithium aluminum hydride, sodium hydride, sodium borohydride, sodium bisulfite, sodium thiosulfate, hydroquinone, methanol, aldehydes, carbon monoxide, ammonia, and the like. The reduction process may be conducted at a temperature between 20° C. and 600° C.

Finally the reforming catalyst can-be further processed into a finished product of size and shape suitable for a specific reactor or process configuration. For example, a powder may be processed by, among other methods, extrusion, pelletizing, or spray drying.

V. Methods of Reforming Hydrocarbons

Reforming catalysts according to the invention can be used in reforming hydrocarbons such as naphtha. Reforming catalysts can be used in dehydrogenation of naphthenes to produce aromatics, isomerization of linear paraffins to form branched paraffins or iso-paraffins, and dehydrocyclization of paraffins to form aromatics, among other reactions. Reforming catalysts can be used to enhance octane number for fuel blending and/or in BTX reactions to yield benzene, toluene, xylenes, ethyl benzene, and other aromatic compounds.

The reforming catalysts according to the invention are superior to reforming catalysts known in the art because the nanocatalyst particles are more strongly anchored to the support, which extends the useful life of the catalyst. In the case of multicomponent catalysts, the reforming catalysts are superior because they comprise catalyst particles comprising two or more catalyst components within the nanocatalyst particle rather than a purely or mainly heterogenous mixture of different types of single component catalyst particles, as are typically found in conventional multicomponent nanocatalysts.

The reforming process is typically carried out in a reactor. Three suitable reactor configurations for reactions such as naphtha catalytic reforming include: a) the semi-regenerative process, where the catalyst is regenerated every 6 to 24 months, and requires that the reactor be shut down; b) the cyclic process where a spare reactor is brought online while another is taken offline for catalyst regeneration; and c) the continuous catalyst regeneration (CCR) process, where the catalyst continuously circulates from the top to the bottom of the reforming reactor and is then fed to an external regeneration unit for reactivation and then sent to the top of the reactor.

Typically, the reforming catalyst is first loaded into the reactor and subjected to a reductive treatment. This treatment usually includes heating the catalyst to a high temperature (400° C.-525° C.) in a pure hydrogen environment. Naphtha is then continuously fed into the reactor with continuously flowing hydrogen. Typical hydrogen to hydrocarbon molar ratios are between 3 and 8.

Reaction conditions are chosen as a compromise among maximizing octane gain, minimizing losses to light gases, and extending catalyst lifetime. Catalytic naphtha reforming is performed in a hydrogen atmosphere to facilitate the hydrogenation of coke precursors, thus minimizing catalyst deactivation and equipment fouling. At the same time, higher partial pressures of hydrogen tend to inhibit dehydrogenation reactions. Total operating pressures range between about 300 kPa to about 3.5 MPa. With respect to temperature, higher values favor both higher octane numbers in the reformate and hydrocracking producing light gases. Typical operating temperatures are between about 460° C. and about 525° C.

The following exemplary procedures where used to prepare reforming catalysts according to the present invention and to test their ability to improve the octane number of a naphtha feed stock and also produce BTX aromatics.

EXAMPLE 1

A reforming catalyst according to the present invention was prepared using platinum and tin as catalyst components. The catalyst was prepared using the following steps and concentrations:

(i) A platinum solution was prepared by dissolving 1.0209 g of $H_2PtCl_6.6H_2O$ (Pt: 38-40%, select 39%) in water and diluting to 100.0 ml. The final concentration of the platinum solution was 0.003982 g Pt/ml.

(ii) A tin solution was prepared by mixing 1.9390 g of $SnCl_2.2H_2O$ (98%) and 5.74 g of 37% HCl solution in water to dissolve the tin $Cl_2$. The Tin solution was then diluted to 200.0 ml to form a solution with a tin concentration of 0.004999 g Sn/ml.

(iii) Solution A was prepared by diluting 23.56 g of the 0.003982 g Pt/ml solution to form 100 g solution and then adding 4.4 g of 37% HCl solution while stirring.

(iv) Solution B was prepared by diluting 12.96 g of the 0.004999 g Sn/ml solution with water to form a 100 g solution and then adding Solution A.

(v) Solution C was prepared by letting Solution B stand for 1 hour and then adding 1.67.g of 37% HCl solution.

(vi) Solution D was prepared by diluting 2.73 g of 45% polyacrylic acid sodium salt solution to 220 g using water and then adding Solution C.

(vii) Solution D was purged with 100 ml/min $N_2$ for 1 hour. The $N_2$ was replaced by 100 ml/min $H_2$ for 20 min. The flask was then sealed overnight while continuously stirring.

(viii) 27.60 g of $Al_2O_3$ in the form of 1/16 inch diameter spheres was placed under vacuum for 30 min and then impregnated with about 80 ml of methanol for 30 min. The methanol excess was removed by using a pipette. The $Al_2O_3$ support was then added to solution D. The resulting mixture was heated by an IR lamp under rotation until all the liquid evaporated.

(ix) The sample, which included platinum and tin atoms initially in a non-zero oxidation state, was then placed in a muffle furnace and heat treated in a $N_2$ according to the following procedure:

1) Heated from room temperature to 120° C. at 3° C./min
2) Held at 120° C. for 2 h
3) Heated from 120° C. to 300° C. at 3° C./min
4) Held at 300° C. for 2 h
5) Heated from 300° C. to 500° C. at 1° C./min
6) Held at 510° C. for 2 h (x) After cooling to room temperature, the sample was taken out and washed twice with hot (80-90° C.) water, using 100 ml each time. This was followed by washing 3 times with water at room temperature using 100 ml each time to remove any remaining sodium ions. The sample was then placed in a drying oven for 2 hours.

(xi) The sample was then impregnated with an HCl solution prepared by mixing 0.83 g of a 37% HCl solution and 29.2 g of water. The sample was dried at room temperature followed by a 2 h period in a drying oven and finally placed in a muffle furnace under flowing air at 200° C. for 2 h. After cooling to room temperature the sample was weighed and packed in a bottle. The resulting catalyst had a weight composition of 0.34% Pt. 0.23% Sn, and 1.08% Cl.

Comparative Study

In the Comparative Study, the inventive Pt—Sn reforming catalyst of Example 1 was loaded in a fixed bed reactor and used for the catalytic reforming of naphtha. For direct comparison, a conventional reforming catalyst was used (i.e., made without the use of the dispersing agent). The conventional reforming catalyst was supported on the same material and had the same elemental composition as the inventive reforming catalyst of Example 1, but was prepared without the use of a dispersing agent. The conventional reforming catalyst and the inventive reforming catalyst of Example 1 were loaded in identical reactors and subjected to the same pretreatment and reaction conditions.

For each reaction test, approximately 21 g of solid catalyst were loaded in a tubular reactor where the heated volume was divided into two equal catalyst beds separated by a reheating zone. Both catalysts were diluted with inert glass beads to improve the isothermicity of the beds. Naphtha feed with density of 59.6° API (0.7405 g/cc), impurity levels below 1 ppm of both sulfur and nitrogen, and initial and final boiling points of 68.7° C. and 143° C., respectively, was dried by flow through a molecular sieve bed to ensure its moisture level was below 20 ppm. Prior to reaction, the oxidized catalyst was reduced in pure hydrogen for 12 h at 480° C. The reforming reaction was conducted at 480° C. and 100 psig, with a continuous feed of 50 g/h of naphtha and 2.11 scf/h of hydrogen. This translates into a weight hourly space velocity (WHSV) of 2.4 $h^{-1}$ and hydrogen to hydrocarbon molar ratio of 5.0. These values are well within the usual ranges of operation for conventional CCR reactors. The outlet gas was analyzed by gas chromatograph (GC) to determine the amounts of hydrogen and light hydrocarbon gases ($C_1$-$C_4$) produced. The reaction was run for 90 hours, at which time the feed gas was stopped and the liquid production collected and its detailed composition and research octane number (RON) were determined.

The results comparing the use of the supported reforming catalyst of Example 1 to a conventional reforming catalyst are shown in Table I. The research octane number (RON) was determined by the standard ASTM engine test method.

TABLE I

| | Naphtha Feed | Reforming Catalyst | |
|---|---|---|---|
| | | Conventional | Example 1 |
| Liquid specific gravity | 0.7405 | 0.7813 | 0.7914 |
| Research octane number (RON) | 67.5 | 87.7 | 92.4 |
| Product distribution wt % | | | |
| $H_2$ | — | 1.7 | 2.0 |
| $C_1$ | — | 0.3 | 0.5 |
| $C_2$ | — | 0.4 | 1.0 |
| $C_3$ | — | 0.8 | 1.7 |
| $C_4$ | — | 0.7 | 1.9 |
| $C_5$ + (reformate) | — | 96.1 | 92.9 |
| $H_2$ production (scf/bbl) | — | 837 | 985 |
| Aromatics composition (wt %) | | | |
| Benzene | 0.24 | 4.02 | 5.31 |
| Toluene | 4.46 | 25.63 | 31.08 |
| o-Xylene | 0.25 | 4.38 | 4.91 |
| m-Xylene | 0.74 | 7.71 | 8.95 |
| p-Xylene | 0.25 | 3.28 | 3.82 |
| Ethylbenzene | 0.49 | 2.30 | 2.69 |
| other aromatics | 0.00 | 2.14 | 2.43 |
| Total aromatics | 6.42 | 49.47 | 59.18 |

The results in Table I show that the inventive reforming catalyst of Example 1 has a highly improved octane number, hydrogen production, and aromatics content kin the liquid reformate product as compared with the conventional reforming catalyst used in the test. The improved increase in specific gravity of the product formed using the inventive reforming catalyst of Example 1 over the product formed using the conventional reforming catalyst is consistent with the values for the higher level of hydrogen produced using the reforming catalyst of Example 1. These results show that the reforming catalyst of the present invention can be used for increasing motor fuel octane number, and also for the production of BTX and other aromatics.

The tests also suggest that providing a reforming catalyst having catalyst particles that include both platinum and tin atoms blended together provides superior catalytic reforming activity. This suggests that the platinum and tin atoms are more evenly dispersed throughout the supported catalyst compared to conventional reforming catalysts that are heated treated or calcined in the absence of a strong bond between catalyst atoms in a non-zero oxidation state and a dispersing/anchoring agent.

EXAMPLE 2

A reforming catalyst according to the present invention was prepared using platinum and tin as catalyst components. The catalyst was prepared using the following steps and concentrations:

(i) 30 g of an $Al_2O_3$ support in form of $\frac{1}{16}$ inch diameter spheres was impregnated with 150 ml of 2.0% sodium hydroxide solution for 2 hours. The $Al_2O_3$ was collected by filter, washed with water and acetone, and then dried at 90° C. for 4 hours.

(ii) 0.2335 g of cis-dichlorobis(diethyl sulfide)-platinum (II) and 0.2254 g of dichlorobis(acetylacetonate)-tin (IV) was dissolved in 20 ml of toluene.

(iii) 30 g of the $Al_2O_3$ from step (i) was added to 30 ml toluene, followed by addition of the solution prepared in step (ii). The mixture was gently agitated by a suspension stir bar for 12 hours in nitrogen atmosphere to form a solid sample. The solid sample was filtered out, washed with toluene, and then dried at 90° C. for 2 hours.

(iv) The sample, which included platinum and tin atoms initially in a non-zero coordinated complex state, was then placed in a muffle furnace and heat treated in air according to the following procedure:
1) Heated from room temperature to 300° C. at 7° C./min
2) Held at 300° C. for 2 h
3) Heated from 300° C. to 500° C. at 3° C./min
4) Held at 500° C. for 2 h (v) After cooling to room temperature, the sample was impregnated with a dilute HCl solution (prepared by mixing 0.83 g of a 37% HCl solution and 29.2 g of water) for 8 hours. The sample was dried in a drying oven at 80° C. for 12 hours. The resulting catalyst had a weight composition of 0.34% Pt, 0.23% Sn, and 1.08% Cl.

EXAMPLE 3

A reforming catalyst according to the present invention was prepared using platinum and tin as catalyst components. The catalyst was prepared using the following steps and concentrations:
(i) 209.1 mg of $Pt(acac)_2$ and 229.2 mg of $Sn(acac)_2Cl_2$ were dissolved in 100 ml acetone.
(ii) 30 g of $Al_2O_3$ support was soaked in 100 ml acetone for 2 hours. Then the acetone was removed by decantation.
(iii) The solution from step (i) was added to the pretreated $Al_2O_3$ support from step (ii) and dried by rotating vacuum evaporation.
(iv) The resulting mixture from step (iii) was placed in an oven at 70° C. for 6 hours and then moved into a preheating muffle furnace at 300° C. for 1 hour and at 480° C. for 3 hour under nitrogen atmosphere.
(v) After cooling to room temperature, the sample was then impregnated with a dilute HCl solution prepared by mixing 0.93 g of a 37% HCl solution and 25 ml of water. The sample was dried at room temperature, followed by a 2 hour period in a drying oven. After cooling to room temperature the sample was weighed and packed in a bottle. The resulting catalyst had a weight composition of 0.34% Pt, 0.23% Sn, and 1.08% Cl.

EXAMPLE 4

A reforming catalyst according to the present invention was prepared using platinum and tin as catalyst components. The catalyst was prepared using the following steps and concentrations:
(i) 275.52 mg of $H_2PtCl_6.6H_2O$ (0.532 mmol) and 133.36 mg of $SnCl_2.2H_2O$ (0.591 mmol) were dissolved in 30 ml ethylene glycol.
(ii) The solution was impregnated onto 30 g of $Al_2O_3$ support.
(iii) The resulting mixture was dried in vacuum oven at 100° C. for 6 hours.
(iv) The sample, which included platinum and tin atoms initially in a non-zero oxidation state, was then placed in a muffle furnace and heat treated under $N_2$ according to the following procedure:
1) Heated from room temperature to 120° C. at 3° C./min
2) Held at 120° C. for 2 h
3) Heated from 120° C. to 300° C. at 3° C./min
4) Held at 300° C. for 2 h
5) Heated from 300° C. to 500° C. at 1° C./min
6) Held at 500° C. for 2 h (v) After cooling down to room temperature, the sample was washed with copious water. The sample was then dried at 80° C. for 2 hours.
(vi) After cooling to room temperature, the sample was then impregnated with a dilute HCl solution prepared by mixing 0.93 g of a 37% HCl solution and 25 ml of water. The sample was dried at room temperature, followed by a 2 hour period at 80° C. in an oven. After cooling to room temperature, the sample was weighed and packed in a bottle. The resulting catalyst had a weight composition of 0.34% Pt, 0.23% Sn,. and 1.08% Cl.

EXAMPLE 5

A reforming catalyst according to the present invention was prepared using platinum and tin as catalyst components. The catalyst was prepared using the following steps and concentrations:
(i) A platinum solution was prepared by dissolving 0.9950 g of $H_2PtCl_6.6H_2O$ (Pt: 38-40%, select 39%) in water and diluting to 100.0 ml final concentration of platinum in the solution was 0.003881 g Pt/ml.
(ii) A tin solution was prepared by mixing 7.66 g of $SnCl_2.2H_2O$ (98%) and 10 g of 37% HCl solution in water to dissolve the $SnCl_2$. The tin solution was then diluted to 200.0 ml to form a solution with a tin concentration of 0.01976 g Sn/ml.
(iii) Solution A was prepared by mixing 4.0 g of 37% HCl, 24.18 g of the 0.003881 g Pt/ml solution prepared in step (i) and 3.21 g of the 0.01976 g Sn/ml solution prepared in step (ii) and then adding 6.26 g of a 0.001169 g/ml glycolic acid solution.
(iv) Solution B was prepared by heating solution A to boiling, refluxing for 10 minutes, and then cooling it to room temperature.
(v) 27.60 g of $Al_2O_3$ in the form of $1/16$ inch diameter spheres was placed under vacuum for 30 minutes and then impregnated with 50 ml of methanol for 30 minutes. The methanol excess was removed by using a pipette. Solution B was then added to the $Al_2O_3$ and impregnated at room temperature until all the liquid evaporated.
(vi) The sample was then dried for 3 hours in a drying oven, and then placed in a muffle furnace and heat treated in air according to the following procedure:
1) Heated from room temperature to 120° C. at 3° C./min
2) Held at 120° C. for 2 hours
3) Heated from room temperature to 300° C. at 3° C./min
4) Held at 300° C. for 2 hours
5) Heated from room temperature to 500° C. at 1° C./min
6) Held at 500° C. for 2 hours (vii) After cooling to room temperature, the sample was taken out. The sample was then impregnated with a dilute HCl solution prepared by mixing 0.83 g of a 37% HCl solution and 29.2 g of water.
(viii) The sample was dried at room temperature, and then dried in a drying oven overnight. After cooling to room temperature the sample was weighed and packed in a bottle. The resulting catalyst had a weight composition of 0.34% Pt, 0.23% Sn and 1.08% Cl.

EXAMPLE 6

A reforming catalyst according to the present invention was prepared using platinum and tin as catalyst components. The catalyst was prepared using the following steps and concentrations:

(i) A platinum solution was prepared by dissolving 1.0200 g of $H_2PtCl_6 \cdot 6H_2O$ (Pt: 38-40%, select 39%) in water and diluting to 100.0 ml. The final concentration of platinum in solution was 0.003978 g Pt/ml.

(ii) A tin solution was prepared by mixing 1.23 g of $SnCl_2 \cdot 2H_2O$ (98%) and 4.3 g of 37% HCl solution in water to dissolve the $SnCl_2$. The tin solution was then diluted to 200.0 ml with water to form a solution having a tin concentration of 0.003236 g Sn/ml.

(iii) Solution A was prepared by diluting 23.59 g of the 0.003978 g Pt/ml solution from step (i) with water to form a 100 g solution and then adding 4.4 g of 37% HCl while stirring.

(iv) Solution B was prepared by diluting 19.62 g of the 0.003236 g Sn/ml solution from step (ii) with water to form a 100 g solution, adding this solution to Solution A, and then adding 1.67 g 37% HCl to Solution B.

(v) Solution C was prepared by diluting 2.73 g of a 45% polyacrylic acid (sodium salt) solution with 220 g of water and adding this to solution B.

(vi) Solution C was purged with 100 ml/min $N_2$ for 1 hour. After that, the $N_2$ was replaced with 100 ml/min $H_2$ for 20 minutes. The flask was then sealed overnight while continuously stirring.

(vii) 27.60 g of $Al_2O_3$ in the form of $\frac{1}{16}$ inch diameter spheres was placed under vacuum for 30 minutes and then impregnated with 50 ml of methanol for 30 minutes. The methanol excess was removed by using a pipette. Solution C was then added to the $Al_2O_3$. The resulting mixture was heated by an IR lamp under rotation until all the liquid evaporated.

(viii) The sample was then dried overnight at drying oven, and then placed in a muffle furnace and heat treated under $N_2$ according to the following procedure:
1) Heated from room temperature to 120° C. at 3° C./min
2) Held at 120° C. for 2 hours
3) Heated from room temperature to 300° C. at 3° C./min
4) Held at 300° C. for 2 hours
5) Heated from room temperature to 500° C. at 1° C./min
6) Held at 500° C. for 2 hours (ix) After cooling to room temperature, the sample was taken out and washed twice with hot (80-90° C.) water, using 100 ml each time. This was followed by washing 3 times with water at room temperature using 100 ml each time to remove any remaining sodium ions. The sample was then placed in a drying oven for 4 hours.

(x) The sample was then impregnated with a dilute HCl solution (prepared by mixing 0.42 g of a 37% HCl solution and 29.6 g of water) overnight at room temperature. Then the sample was dried at about 40° C., and then dried in a drying oven for 4 hours. After cooling to room temperature the sample was weighed and packed in a bottle. The resulting catalyst had a weight composition of 0.34% Pt, 0.23% Sn, and 0.54% Cl.

EXAMPLE 7

A reforming catalyst according to the present invention was prepared using platinum and tin as catalyst components. The catalyst was prepared using the following steps and concentrations:

(i) A platinum solution was prepared by diluting 406.35 mg of a 25.52 wt % $H_2PtCl_6$ aqueous solution to 15 ml with water.

(ii) A tin solution was prepared by dissolving 133.36 mg of $SnCl_2 \cdot 2H_2O$ (98%) to 15 ml with de-ionized water together with 4 g 37% HCl.

(iii) Solution A was prepared by mixing the platinum solution from step (i) with the tin solution from step (ii).

(iv) Solution B was prepared by adding 215.75 mg citric acid to Solution A.

(v) Solution B was refluxed for 1 hour, then cooled down to room temperature while continuously stirring.

(vi) 30 g of $Al_2O_3$ in the form of $\frac{1}{16}$ inch diameter spheres was placed under vacuum for 30 minutes and then impregnated with about 50 ml of methanol for 30 minutes. The methanol excess was removed by using a pipette. The $Al_2O_3$ support was then added to solution B. The resulting mixture was heated on the hotplate until all the liquid evaporated.

(vii) The resulting mixture was placed into an oven at 80° C. for 3 hours.

(viii) The sample, which included platinum and tin atoms initially in a non-zero oxidation state, was then placed in a muffle furnace and heat treated under $N_2$ according to the following procedure:
1) Heated from room temperature to 120° C. at 3° C./min
2) Held at 120° C. for 2 h
3) Heated from 120° C. to 300° C. at 3° C./min
4) Held at 300° C. for 2 h
5) Heated from 300° C. to 500° C. at 1° C./min
6) Held at 500° C. for 2 h (ix) After cooling down to room temperature, the heat treated catalyst was washed with 1500 ml de-ionized water (750 ml cold+750 ml warm water (~80° C.)).

(xi) The sample was then impregnated with a dilute HCl solution prepared by mixing 0.93 g of a 37% HCl solution and 25 ml of water. The sample was dried at room temperature followed by a 2 hour period in a drying oven. After cooling to room temperature the sample was weighed and packed in a bottle. The resulting catalyst had a weight composition of 0.34% Pt, 0.23% Sn, and 1.08% Cl.

EXAMPLE 8

A reforming catalyst according to the present invention was prepared using platinum as the active component, an alumina support, and an ethylene glycol dispersing agent. The catalyst was prepared using the following steps and concentrations:

(i) A platinum solution was prepared by dissolving 5 g of $H_2PtCl_6 \cdot 6H_2O$ (39 wt % Pt) in ethylene glycol and diluted to 200 ml. The final concentration of the platinum in solution was 0.00975 g Pt/ml.

(ii) Solution A was prepared by diluting 9 ml of the 0.00975 g Pt/ml $H_2PtCl_6$ solution from step (i) to 21.5 ml with water.

(iii) Solution B was prepared by adding 4.5 ml of a 1 mol/L NaOH/ethylene glycol solution to solution A while continuously stirring.

(iv) Solution B was maintained at 130° C. for 30 minutes, then cooled to room temperature while continuously stirring.

(v) 28.86 g of $Al_2O_3$ was placed under vacuum for 30 minutes and then impregnated with about 50 ml of methanol for 30 minutes. The methanol excess was removed by using a pipette. Then Solution B from step (iv) was added to the treated $Al_2O_3$ support.

(vi) The resulting mixture was placed into vacuum oven at 100° C. for 6 hour until all the liquid evaporated.

(vii) After cooling down to room temperature, the dried catalyst was washed by 1500 ml de-ionized water (750 ml cold+750 ml warm water (~80° C.)). The sample was then dried at 80° C. for 2 hours.

(viii) The sample was then impregnated with a dilute HCl solution prepared by mixing 0.81 g of a 37% HCl solution and 25 ml of water. The sample was dried at room temperature followed by a 2 hour period in a drying oven. After cooling to room temperature the sample was weighed and packed in a bottle. The resulting catalyst had a weight composition of 0.3% Pt and 1% Cl.

The supported reforming catalysts of Examples 2-8 were used to reform naphtha using the same procedure described above with respect to Example 1. The results of the reforming procedures using the catalysts of Examples 2-8 are set forth in Table II.

2) Held at 120° C. for 2 hours
3) Heated from room temperature to 300° C. at 3° C./min
4) Held at 300° C. for 2 hours
5) Heated from room temperature to 480° C. at 1° C./min
6) Held at 480° C. for 2 hours (vi) After cooling to room temperature, the sample was removed from the muffle furnace. The sample was then impregnated with a dilute HCl solution prepared by mixing 0.80 g of a 37% HCl solution and 29.2 g of water.

(vii) The sample was dried at about, 40° C. and then dried in a drying oven overnight. After cooling to room temperature the sample was weighed and packed in a bottle. The resulting catalyst had a weight composition of 0.3% Pt and 1% Cl.

TABLE II

| | Naphtha Feed | Examples | | | | | | |
|---|---|---|---|---|---|---|---|---|
| | | 2 | 3 | 4 | 5 | 6 | 7 | 8 |
| Liquid specific gravity | 0.7405 | 0.7728 | 0.7792 | 0.7657 | 0.7865 | 0.7861 | 0.7861 | 0.804 |
| Research octane number (RON) | 67.5 | 84.2 | 88.1 | 82.8 | 91.6 | 91.8 | 91.4 | 97.0 |
| Product distribution (wt %) | | | | | | | | |
| $H_2$ | — | 1.5 | 1.5 | 1.0 | 2.1 | 2.2 | 2.0 | 1.8 |
| $C_1$ | — | 0.2 | 0.5 | 0.5 | 0.4 | 0.4 | 0.4 | 0.8 |
| $C_2$ | — | 0.4 | 0.8 | 0.7 | 0.7 | 0.6 | 0.7 | 1.6 |
| $C_3$ | — | 0.8 | 1.3 | 1.1 | 1.3 | 1.4 | 1.6 | 3.1 |
| $C_4$ | — | 0.7 | 1.4 | 1.2 | 1.5 | 1.4 | 1.8 | 3.6 |
| $C_5$+ (reformate) | — | 96.4 | 94.5 | 95.5 | 94.0 | 94.0 | 93.5 | 89.1 |
| $H_2$ production (scf/bbl) | — | 739 | 739 | 492 | 1034 | 1083 | 985 | 886 |
| Aromatics (wt %) | | | | | | | | |
| Benzene | 0.24 | 4.10 | 3.98 | 2.32 | 5.08 | 5.92 | 5.12 | 6.30 |
| Toluene | 4.46 | 22.58 | 26.38 | 17.16 | 29.86 | 31.52 | 30.33 | 36.01 |
| o-Xylene | 0.25 | 3.40 | 4.10 | 2.62 | 4.96 | 5.33 | 5.01 | 6.07 |
| m-Xylene | 0.74 | 6.26 | 7.76 | 5.29 | 8.52 | 8.73 | 8.60 | 10.21 |
| p-Xylene | 0.25 | 2.61 | 3.34 | 2.13 | 3.70 | 3.75 | 3.76 | 4.52 |
| Ethylbenzene | 0.49 | 2.12 | 2.36 | 1.63 | 2.62 | 2.68 | 2.64 | 3.03 |
| Other aromatics | 0.00 | 1.71 | 2.08 | 1.38 | 2.46 | 2.49 | 2.61 | 2.80 |
| Total aromatics | 6.42 | 42.76 | 50.00 | 32.52 | 57.17 | 60.41 | 58.07 | 68.95 |

EXAMPLE 9

A reforming catalyst according to the present invention was prepared using platinum as the catalyst component. The catalyst was prepared using the following steps and concentrations:

(i) A platinum solution was prepared by dissolving 1.0200 g of $H_2PtCl_6 \cdot 6H_2O$ (Pt: 38-40%, select 39%) in water and diluting to 100.0 ml. The final concentration of platinum in this solution was 0.003978 g Pt/ml.

(ii) Solution A was prepared by diluting 3.00 g of a 0.001 169 g/ml glycolic acid solution to 22.6 g and then mixing this with 22.62 g of a 0.003978 g Pt/ml solution.

(iii) Solution B was prepared by heating solution A to boiling, refluxing for 10 minutes, and then cooling to room temperature.

(iv) 30.00 g of $Al_2O_3$ in the form of 1/16 inch bar was placed under vacuum for 30 minutes and then impregnated with 80 ml of methanol for 30 minutes. The methanol excess was removed using a pipette. Solution B was then added to the $Al_2O_3$ and impregnated at room temperature overnight.

(v) The sample was heated to about 40° C. and held until it was dry, then dried for 3 hours in a drying oven, and then placed in a muffle furnace and heat treated under $N_2$ according to the following procedure:
1) Heated from room temperature to 120° C. at 3° C./min

EXAMPLE 10

A reforming catalyst according to the present invention was prepared using platinum as the catalyst component. The catalyst was prepared using the following steps and concentrations:

(i) A platinum solution was prepared by dissolving 1.0200 g of $H_2PtCl_6 \cdot 6H_2O$ (Pt: 38-40%, select 39%) in water and diluting to 100.0 ml. The final concentration of platinum. in the solution was 0.003978 g Pt/ml.

(ii) Solution A was prepared by diluting 22.62 g of the 0.003978 g Pt/ml solution from step (i) to 204 ml with water.

(iii) Solution B was prepared by diluting 1.23 g of a 45% polyacrylic acid (sodium salt) solution to 204 ml with water and then adding this to solution A.

(iv) Solution B was purged with $N_2$ at 100 ml/min for 1 hour. Thereafter, the $N_2$ was replaced by 100 ml/min $H_2$ for 20 minutes. The flask was then sealed overnight while continuously stirring.

(v) 30.00 g of $Al_2O_3$ in the form of 1/16 inch bar was placed under vacuum for 30 minutes and then impregnated with 80 ml of methanol for 30 minutes. The methanol excess was removed with a pipette. Solution B was then added to the treated $Al_2O_3$. The resulting mixture was heated using an IR lamp until all the liquid evaporated.

(vi) The sample was dried overnight in a drying oven, then placed in a muffle furnace and heat treated under $N_2$ according to the following procedure:
1) Heated from room temperature to 120° C. at 3° C./min
2) Held at 120° C. for 2 hours
3) Heated from room temperature to 300° C. at 3° C./min
4) Held at 300° C. for 2 hours
5) Heated from room temperature to 480° C. at 1° C./min
6) Held at 480° C. for 2 hours (vii) After cooling to room temperature, the sample was taken out and washed twice with hot (80-90° C.) water, using 100 ml each time. This was followed by washing 3 times with water at room temperature using 100 ml each time to remove any remaining sodium ions. The sample was then placed in a drying oven for 2 hours.

(viii) The sample was then impregnated with a dilute HCl solution prepared by mixing 0.80 g of a 37% HCl solution and 29.2 g of water, The sample was dried at about 40° C., and then dried in a drying oven overnight. After cooling to room temperature the sample was weighed and packed in a bottle. The resulting catalyst had a weight composition of 0.3% Pt and 1% Cl.

EXAMPLE 11

A supported platinum reforming catalyst according to the present invention was prepared using the following steps and concentrations:
(i) 30 g of $Al_2O_3$ support in form of 1/16 inch diameter spheres was impregnated with 150 ml of a 2.0% sodium hydroxide solution for 2 hours. The treated $Al_2O_3$ was collected by filtration, washed with water and, acetone, and then dried at 90° C. for 4 hours.
(ii) 0.206 g of cis-dichlorobis(diethyl sulfide)-platinum (II) was dissolved in 20 ml toluene.
(iii) 30 g of the treated $Al_2O_3$ from step (i) was added to 30 ml toluene, followed by addition of the solution prepared in step (ii). The whole mixture was gently agitated using a suspension stir bar for 12 hours under a nitrogen atmosphere to form a solid sample. The solid sample was removed by filteration, washed with toluene, and then dried at 90° C. for 2 hours.
(iv) After cooling to room temperature, the sample was impregnated with a dilute HCl solution (prepared by mixing 0.768 g of a 37% HCl solution and 29.2 g of water) for 8 hours. The sample was dried in a drying oven at 80° C. for 12 hours. The resulting catalyst had a weight composition of 0.30% Pt and 1.0% Cl.

EXAMPLE 12

A reforming catalyst according to the present invention was prepared using platinum as the catalyst component. The catalyst was prepared using the following steps and concentrations:
(i) A platinum solution was prepared by dissolving 5.0942 g of $H_2PtCl_6.6H_2O$ (Pt: 38-40%, select 39%) in water and diluting to 100.0 ml. The final concentration of platinum in the solution was 0.01987 g Pt/ml.
(ii) Solution A was prepared by mixing 4.53 g of the 0.01987 g Pt/ml solution from step (i) with 0.035 g of 98% glycine and then diluting to 25 g.
(iii) Solution B was prepared by heating solution A to boiling, refluxing for 30 minutes, and then cooling to room temperature.
(v) 30.00 g of $Al_2O_3$ in the form of 1/16 inch bar was placed under vacuum for 30 minutes and then impregnated with 50 ml of methanol for 30 minutes. The methanol excess was removed using a pipette. Solution B was then added to the treated $Al_2O_3$ and impregnated at about 40° C. until it was dry.
(vi) The sample was then dried in a drying oven overnight, then placed in a muffle furnace and heat treated in air according to the following procedure:
1) Heated from room temperature to 120° C. at 3° C./min
2) Held at 120° C. for 2 hours
3) Heated from room temperature to 300° C. at 3° C./min
4) Held at 300° C. for 2 hours
5) Heated from room temperature to 500° C. at 1° C./min
6) Held at 500° C. for 2 hours (vii) After cooling to room temperature, the sample was removed from the muffle furnace. The sample was then impregnated with a dilute HCl solution prepared by mixing 0.83 g of a 37% HCl solution and 24.2 g of water.

(viii) The sample was dried at about 40° C., and then dried in a drying oven for 3 hours. After cooling to room temperature the sample was weighed and packed in a bottle. The resulting catalyst had a weight composition of 0.3% Pt and 1% Cl.

EXAMPLE 13

A reforming catalyst according to the present invention was prepared using platinum as active component, an alumina support, and a citric acid dispersing agent. The catalyst was prepared using the following steps and concentrations:
(i) A platinum solution was prepared by diluting 343.73 mg of a 25.52 wt % $H_2PtCl_6$ aqueous solution to 50 ml with water.
(ii) 86.45 mg of citric acid was dissolved to 50 ml in water and then added to the above $H_2PtCl_6$ aqueous solution from step (i).
(iii) The mixture from step (ii) was refluxed for 1 hour, then cooled down to room temperature while continuously stirring.
(iv) 28.86 g of $Al_2O_3$ was placed under vacuum for 30 minutes and then impregnated with about 50 ml of methanol for 30 minutes. The methanol excess was removed by pipette. The $Al_2O_3$ support was then added to the solution from step (iii). The resulting mixture was dried on the hotplate until all the liquid evaporated.
(v) The resulting mixture was placed into oven at 80° C. for 3 hours.
(vi) The sample, which included platinum atoms initially in a non-zero oxidation state, was then placed in a muffle furnace and heat treated under $N_2$ according to the following procedure:
(1) Heated from room temperature to 120° C. at 3° C./min
(2) Held at 120° C. for 2 h
(3) Heated from 120° C. to 300° C. at 3° C./min
(4) Held at 300° C. for 2 h
(5) Heated from 300° C. to 500° C. at 1° C./min
(6) Held at 500° C. for 2h (vii) After cooling down to room temperature, the heat treated catalyst was washed with 1500 ml de-ionized water (750 ml cold+750 ml warm water (~80° C.)).

(viii) The sample was then impregnated with a dilute HCl solution prepared by mixing 0.81 g of a 37% HCl solution and 25 ml of water. The sample was dried at room temperature, followed by a 2 hour period in a drying oven at 80° C. After cooling to room temperature the sample was weighed and packed in a bottle. The resulting catalyst had a weight composition of 0.3% Pt and 1% Cl.

EXAMPLE 14

A reforming catalyst prepared essentially using the same procedure described above in Example 11, except that after step (iii) the solid sample was heat treated in a muffle furnace according to the following procedure:
1) Heated from room temperature to 300° C. at 7° C./min in air atmosphere
2) Held at 300° C. for 2 h
3) Heated from 300° C. to 500° C. at 3° C./min and changed into nitrogen atmosphere
4) Held at 500° C. for 3 h. The resulting catalyst had a weight composition of 0.30% Pt and 1.0% Cl.

The supported reforming catalysts of Examples 9-14 were used to reform naphtha using the same procedure described above with respect to Example 1. The results of the reforming procedures using the catalysts of Examples 9-14 are set forth in Table III.

(iv) Solution B was prepared by heating solution A to boiling, refluxing for 30 minutes, and then cooling to room temperature.
(v) 27.60 g of $Al_2O_3$ in the form of 1/16 inch diameter spheres was placed under vacuum for 30 minutes and then impregnated with 50 ml of methanol for 30 minutes. The methanol excess was removed using a pipette. Solution B was then added to the treated $Al_2O_3$ and impregnated at room temperature overnight. The sample was then heated to about 40° C. until all the liquid evaporated.
(vi) The sample was then dried in a drying oven overnight, then placed in a muffle furnace and heat treated in air according to the following procedure:
   1) Heated from room temperature to 120° C. at 3° C./min
   2) Held at 120° C. for 2 hours
   3) Heated from room temperature to 300° C. at 3° C./min
   4) Held at 300° C. for 2 hours
   5) Heated from room temperature to 500° C. at 1° C./min
   6) Held at 500° C. for 2 hours

TABLE III

| | Naphtha | Examples | | | | | |
|---|---|---|---|---|---|---|---|
| | Feed | 9 | 10 | 11 | 12 | 13 | 14 |
| Liquid specific gravity | 0.7405 | 0.7949 | 0.7879 | 0.7606 | 0.7939 | 0.7826 | 0.7559 |
| Research octane number (RON) | 67.5 | 95.0 | 89.2 | 74.7 | 96.8 | 91.2 | 73.2 |
| Product distribution (wt %) | | | | | | | |
| $H_2$ | — | 2.1 | 1.7 | 0.4 | 2.3 | 1.9 | 0.2 |
| $C_1$ | — | 0.8 | 0.4 | 0.2 | 0.9 | 0.6 | 0.3 |
| $C_2$ | — | 1.5 | 0.6 | 0.1 | 1.8 | 1.2 | 0.1 |
| $C_3$ | — | 2.9 | 1.5 | 0.4 | 3.4 | 2.6 | 0.6 |
| $C_4$ | — | 3.2 | 1.4 | 0.1 | 4.2 | 2.7 | 0.2 |
| $C_5$+ (reformate) | — | 89.5 | 94.4 | 98.8 | 87.4 | 91.0 | 98.6 |
| $H_2$ production (scf/bbl) | — | 1034 | 837 | 497 | 1133 | 936 | 98 |
| Aromatics (wt %) | | | | | | | |
| Benzene | 0.24 | 6.22 | 5.32 | 4.24 | 6.47 | 5.90 | 4.52 |
| Toluene | 4.46 | 34.04 | 30.21 | 17.90 | 34.74 | 30.36 | 17.55 |
| o-Xylene | 0.25 | 5.52 | 5.43 | 2.24 | 5.70 | 4.96 | 2.02 |
| m-Xylene | 0.74 | 9.41 | 8.37 | 4.33 | 9.72 | 8.42 | 4.43 |
| p-Xylene | 0.25 | 4.15 | 3.72 | 1.65 | 4.32 | 3.70 | 1.57 |
| Ethylbenzene | 0.49 | 2.82 | 2.62 | 1.52 | 2.88 | 2.59 | 1.47 |
| Other aromatics | 0.00 | 2.50 | 2.39 | 0.73 | 2.54 | 2.57 | 0.50 |
| Total aromatics | 6.42 | 64.67 | 58.06 | 32.60 | 66.36 | 58.50 | 32.06 |

EXAMPLE 15

A reforming catalyst according to the present invention was prepared using platinum and tin as catalyst components. The catalyst was prepared using the following steps and concentrations:
(i) A platinum solution was prepared by dissolving 1.0200 g of $H_2PtCl_6.6H_2O$ (Pt: 38-40%, select 39%) in water and diluting to 100.0 ml. The fmal concentration of platinum in this sohltion was 0.003978 g Pt/ml.
(ii) A tin solution was prepared by mixing 1.23 g of $SnCl_2.2H_2O$ (98%) and 4.3 g of 37% HCl solution in water to dissolve the $SnCl_2$. The Tin solution was then diluted with water to 200.0 ml to form a solution with a tin concentration of 0.003236 g Sn/ml.
(iii) Solution A was prepared by mixing 4.0 g of 37% HCl, 23.59 g of the 0.003978 g Pt/ml solution from step (i), 19.62 g of the 0.003236 g Sn/ml from step (ii), and 0.08 g of glycine.

(vii) After cooling to room temperature, the sample was taken out. The sample was then impregnated with a dilute HCl solution prepared by mixing 0.83 g of a 37% HCl solution and 24.2 g of water.
(viii) The sample was dried at room temperature for 2 hours, then heated to about 40° C. until all the liquid evaporated, and then dried in a drying oven for 3 hours. After cooling to room temperature the sample was weighed and packed in a bottle. The resulting catalyst had a weight composition of 0.34% Pt, 0.23% Sn, and 1.08% Cl.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A multicomponent reforming catalyst for use in reforming hydrocarbons, comprising:
   a plurality of nanocatalyst particles having a size less than about 100 nm, at least a portion of the nanocatalyst particles comprising multicomponent particles, each multicomponent particle including a first component selected from the group consisting of platinum, palladium, rhodium, iridium, and mixtures thereof and a second component selected from the group consisting of tin, rhenium, germanium, lead, arsenic, antimony, tungsten, osmium, cadmium, indium, titanium, phosphorus, gallium, ruthenium, calcium, magnesium, barium, strontium, and mixtures thereof;
   a support material; and
   a dispersing agent anchoring at least a portion of the nanocatalyst particles to the support material, the dispersing agent comprising a plurality of organic molecules that have at least one functional group capable of binding to the nanocatalyst particles and at least one other functional group capable of binding to the support material, the dispersing agent molecules forming a bond between the support material and the nanocatalyst particles.

2. A multicomponent reforming catalyst as defined in claim 1, wherein at least a portion of atoms in the nanocatalyst particles are in a non-zero oxidation state.

3. A multicomponent reforming catalyst as defined in claim 1, wherein at least a portion of atoms in the nanocatalyst particles are in a zero oxidation state.

4. A multicomponent reforming catalyst as defined in claim 1, wherein the first component of the multicomponent catalyst particles comprises platinum as a primary catalyst component and the second component of the multicomponent catalyst particles comprises one or more of tin, rhenium or iridium as a secondary catalyst component.

5. A multicomponent reforming catalyst as defined in claim 1, wherein the multicomponent catalyst particles comprise an alloy, combination, mixture, interspersion, or decoration of dissimilar metals.

6. A multicomponent reforming catalyst as defined in claim 1, wherein the nanocatalyst particles have a size less than about 10 nm.

7. A multicomponent reforming catalyst as defined in claim 1, wherein the nanocatalyst particles have a size less than about 5 nm.

8. A multicomponent reforming catalyst as defined in claim 1, wherein the dispersing agent is selected from the group consisting of polyacrylic acid, polyacrylic acid salts, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, polypropylene glycol, and combinations thereof.

9. A multicomponent reforming catalyst as defined in claim 1, wherein the dispersing agent is selected from the group consisting of glycine, alanine, glycolic acid, lactic acid, sugar, glucose, citric acid, hydroxy dicarboxylic acids, oxalic acid, malonic acid, maleic acid, ethanolamine, mercaptoethanol, 2-mercaptoacetate, sulfobenzyl alcohol, sulfobenzoic acid, sulfobenzyl thiol, sulfobenzyl amine, and combinations thereof.

10. A method of reforming hydrocarbons, comprising catalyzing the formation of at least one of an aromatic compound or a branched paraffin using the multicomponent reforming catalyst of claim 1.

11. A multicomponent reforming catalyst for use in reforming hydrocarbons, comprising:
    a plurality of nanocatalyst particles having a size less than 100 nm and comprising one or more of platinum, palladium, rhodium, or iridium and one or more of tin, rhenium, germanium, lead, arsenic, antimony, tungsten, osmium, cadmium, indium, titanium, phosphorus, gallium, ruthenium, calcium, magnesium, barium, or strontium, wherein the nanocatalyst particles provide catalytic activity for reforming hydrocarbons;
    a support material; and
    a dispersing agent anchoring at least a portion of the nanocatalyst particles to the support material, wherein the dispersing agent comprises at least one of a polymer or an organic molecule having at least one type of functional group selected from the group consisting of an amide, an amine, a thiol, a sulfonic acid, a sulfonyl halide, an acyl halide, a carboxyl, a carbonyl, a hydroxyl, derivatives thereof, and combinations thereof, the dispersing agent molecules forming a bond between the support material and the nanocatalyst particles.

12. A multicomponent reforming catalyst as defined in claim 11, wherein the dispersing agent is selected from the group consisting of polyacrylic acid, polyacrylic acid salts, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, polypropylene glycol, and combinations thereof.

13. A multicomponent reforming catalyst as defined in claim 11, wherein the dispersing agent is selected from the group consisting of glycine, alanine, glycolic acid, lactic acid, sugar, glucose, citric acid, hydroxy dicarboxylic acids, oxalic acid, malonic acid, maleic acid, ethanolamine, mercaptoethanol, 2-mercaptoacetate, sulfobenzyl alcohol, sulfobenzoic acid, sulfobenzyl thiol, sulfobenzyl amine, and combinations thereof.

14. A multicomponent reforming catalyst as defined in claim 11, wherein the at least a portion of the nanocatalyst particles comprise an alloy, combination, mixture, interspersion, or decoration of different metals.

15. A method of manufacturing a multicomponent reforming catalyst, comprising:
    (i) providing a plurality of catalyst atoms comprising a first component selected from the group consisting of platinum, palladium, rhodium, iridium, and mixtures thereof and a second component selected from the group consisting of tin, rhenium, germanium, lead, arsenic, antimony, tungsten, osmium, cadmium, indium, titanium, phosphorus, gallium, ruthenium, calcium, magnesium, barium, strontium, and mixtures thereof;
    (ii) providing a dispersing agent comprising a plurality of organic molecules that have at least one functional group capable of binding to the plurality of catalyst atoms and a second functional group capable of binding to a support material;
    (iii) reacting the dispersing agent with the first and second components to form a catalyst complex comprised of catalyst atoms and dispersing agent;
    (iv) applying the catalyst complex to a support to yield an intermediate catalyst composition in which the plurality of catalyst atoms are in a non-zero oxidation state; and
    (v) causing nanocatalyst particles having a size less than about 100 nm to be anchored to the support material by a reaction product of the dispersing agent and support material, at least a portion of the nanocatalyst particles comprising multicomponent particles, each including the first and second components.

16. A method as defined in claim 15, the first and second functional groups comprising at least one member selected from the group consisting of a hydroxyl, a carboxyl, a carbonyl, an amide, an amine, a thiol, a sulfonic acid, sulfonyl halide, an acyl halide, an organometallic complex, and combinations thereof.

17. A method as defined in claim 15, wherein the support material comprises at least one of silica, alumina, zeolites, or a metal oxide.

18. A method as defined in claim 15, wherein at least a portion of the catalyst complex comprises an organometallic complex having the general formula:

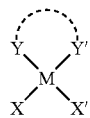

wherein:
a) X and X' are chosen independently of one another from the group comprising R, OR, OC(=O)R, halogens and combinations of these, where R stands for an alkyl or aryl group; and
b) Y and Y' are electron-donating atoms selected from the group consisting of O, N, P, S, and combinations of these.

19. A method as defined in claim 15, further comprising heat treating the multicomponent reforming catalyst while at least a portion of the catalyst atoms are maintained in a non-zero oxidation state.

20. A method as defined in claim 15, further comprising removing at least a portion of the solvent from the one or more catalyst complex formed in (iii) to yield a dried catalyst complex material that is later reconstituted with one or more solvents prior to performing (iv).

21. A method of manufacturing a supported reforming catalyst, comprising:
(i) providing a plurality of catalyst atoms comprising platinum and optionally at least one other type of metal;
(ii) providing a dispersing agent comprising a plurality of organic molecules that have at least one functional group capable of binding to the catalyst atoms;
(iii) reacting the dispersing agent with the catalyst atoms to form a catalyst complex comprised of catalyst atoms and dispersing agent;
(iv) applying the catalyst complex to a support to yield an intermediate catalyst composition in which at least a portion of the catalyst atoms are in a non-zero oxidation state; and
(v) heat treating the intermediate catalyst composition at a temperature above about 50° C. in an inert or oxidizing environment in order to maintain at least a portion of the catalyst atoms in the non-zero oxidation state,
the method yielding a supported reforming catalyst in which a plurality of nanocatalyst particles comprising platinum, and optionally at least one other type of metal, and having a size less than about 100 nm are anchored to the support material by a reaction product of the dispersing agent and support material.

22. A method as defined in claim 21, further comprising partially reducing the catalyst atoms from a higher oxidation state to a lower non-zero oxidation state prior to performing (v).

23. A method as defined in claim 22, wherein the catalyst atoms are partially reduced by exposing the nanocatalyst particles to $H_2$ at a temperature below about 100° C.

24. A method as defined in claim 21, further comprising reducing the catalyst atoms to a zero oxidation state after performing (v).

25. A method as defined in claim 21, wherein the at least one functional group of the dispersing agent is selected from the group consisting of a hydroxyl, a carboxyl, a carbonyl, an amide, an amine, a thiol, a sulfonic acid, sulfonyl halide, an acyl halide, an organometallic complex, and combinations thereof.

26. A method as defined in claim 21, wherein at least a portion of the nanocatalyst particles comprise an alloy, combination, mixture, decoration, or interspersion of the platinum and at least one of palladium, rhodium, iridium, tin, rhenium, germanium, lead, arsenic, antimony, tungsten, osmium, cadmium, indium, titanium, phosphorus, gallium, ruthenium, calcium, magnesium, barium, or strontium.

27. A supported reforming catalyst manufactured according to the method of claim 21.

28. A method of reforming hydrocarbons comprising catalyzing the formation of at least one of an aromatic compound or a branched paraffin using the supported reforming catalyst of claim 27.

29. A multicomponent catalyst complex for use in manufacturing a supported reforming catalyst, comprising:
a plurality of catalyst atoms including a first component selected from the group consisting of platinum, palladium, rhodium, iridium, and mixtures thereof and a second component selected from the group consisting of tin, rhenium, germanium, lead, arsenic, antimony, tungsten, osmium, cadmium, indium, titanium, phosphorus, gallium, ruthenium, calcium, magnesium, barium, strontium, and mixtures thereof; and
a dispersing agent complexed with the catalyst atoms, the dispersing agent comprising at least one of:
an organic molecule having at least one functional group capable of chemically binding to the catalyst atoms and at least one other functional group capable of chemically binding to a support material used to form a supported reforming catalyst; or
a polymer or an organic molecule having at least two functional groups selected from the group consisting of an amide, an amine, a thiol, a sulfonic acid, a sulfonyl halide, an acyl halide, a carboxyl, a carbonyl, a hydroxyl, derivatives thereof, and combinations thereof, with the proviso that if one of the functional groups is a hydroxyl or thiol, the polymer or organic molecule includes at least one other functional group selected from the group consisting of an amide, an amine, a sulfonic acid, a sulfonyl halide, an acyl halide, a carboxyl, a carbonyl, and derivatives thereof.

30. A method of manufacturing a multicomponent catalyst complex for use in manufacturing a supported reforming catalyst, comprising:
(i) providing a plurality of catalyst atoms comprising a first component selected from the group consisting of platinum, palladium, rhodium, iridium, and mixtures thereof and a second component selected from the group consisting of tin, rhenium, germanium, lead, arsenic, antimony, tungsten, osmium, cadmium, indium, titanium, phosphorus, gallium, ruthenium, calcium, magnesium, barium, strontium, and mixtures thereof;
(ii) providing a dispersing agent comprising at least one of:
an organic molecule having at least one functional group capable of chemically binding to the catalyst atoms and at least one other functional group capable of binding to a support material used to form a supported reforming catalyst; or a polymer or an organic molecule having at least two functional groups selected from the group consisting of an amide, an amine, a thiol, a sulfonic acid, a sulfonyl halide, an acyl halide, a carboxyl, a carbonyl, a hydroxyl, derivatives thereof, and combinations thereof, with the proviso that if one of the functional groups is a hydroxyl or thiol, the polymer or organic molecule includes at least one other functional group selected from the group consisting of an amide, an amine, a sulfonic acid, a sulfonyl halide, an acyl halide, a carboxyl, a carbonyl, and derivatives thereof; and (iii) reacting the dispersing agent with the first and second components to form the multicomponent catalyst complex comprised of catalyst atoms and dispersing agent.

* * * * *

UNITED STATES PATENT AND TRADEMARK OFFICE
CERTIFICATE OF CORRECTION

PATENT NO. : 7,569,508 B2
APPLICATION NO. : 11/101241
DATED : August 4, 2009
INVENTOR(S) : Zhou et al.

It is certified that error appears in the above-identified patent and that said Letters Patent is hereby corrected as shown below:

Title page
Item 75, inventor 3 (Zhihua Wu), change "Lawrenceville" to --Plainsboro--
Item 75, inventor 4 (Zhenhua Zhou), change "Pennington" to --Lawrenceville--

Page 2, Right Column under publication
Change "Li, et al., "Preparation and Charaterization of Multiwalled Carbon nanotube-Supported Platinum for Cathode Catalysts of Direct Methanol Fuel Cells", *J. Phys. Chem*, B, vol. 107, pp. 6292-6299 (Jun. 6, 2003)." to --Li, et al., "Preparation and Characterization of Multiwalled Carbon nanotube-Supported Platinum for Cathode Catalysts of Direct Methanol Fuel Cells", *J. Phys. Chem*, B, vol. 107, pp. 6292-6299 (Jun. 6, 2003).--

Page 3, Left Column under publication
Change "Morioka, et al., "Partial oxidation of methane to synthesis gas over supported Ni catalysts prepared from Ni catalysts prepared from Ni-Ca/Al-layered double hydroxide", *Applied Catalysts A: General*215 (2001) 11-19." to --Morioka, et al., "Partial oxidation of methane to synthesis gas over supported Ni catalysts prepared from Ni-Ca/Al-layered double hydroxide", *Applied Catalysts A: General* 215 (2001) 11-19.--

Page 3, Right Column under publication
Change "Sun et al., "Monodisperse FePt Nanoparticles and Ferromagnetic FePt Nanycrystal Superlattices", Mar. 17 2000, Science, vol. 287, pp. 1989-1992." to --Monodisperse FePt Nanoparticles and Ferromagnetic FePt Nanocrystal Superlattices", Mar. 17 2000, Science, vol. 287, pp. 1989-1992.--
Change "Bonnemann et al., "Nanoscale collodial metals and alloys stabilized by solvents and surfactants Preparation and use as catalyst precursors", Journal of Organometallic Chemistry 520 (1996), 143-162." to --Bonnemann et al., "Nanoscale colloidal metals and alloys stabilized by solvents and surfactants Preparation and use as catalyst precursors", Journal of Organometallic Chemistry 520 (1996), 143-162.--

Column 3
Line 59, change "particles" to --particle--

Signed and Sealed this

Eighth Day of June, 2010

David J. Kappos
*Director of the United States Patent and Trademark Office*

Column 4
Line 38-39, insert a --.-- after "longevity"
Line 48, change "either-component" to --either component--

Column 5
Line 64, change "Iii" to --In--

Column 6
Line 1, change "as-polymers" to --as polymers--
Line 5-6, change "hydrogen-bonding" to --hydrogen bonding--
Line 38, delete the "," after "molecular"

Column 7
Line 62, insert a --,-- after "ionic"

Column 8
Line 57, delete the "," before "surface"

Column 9
Line 19, change "structure" to --structures--
Line 23, insert a --.-- after "filaments"

Column 10
Line 18, change "a." to --a--
Line 53, delete the "," after "preferred"
Line 54, delete the ":" after "times"

Column 11
Line 18, delete the "," after "present"
Line 28, delete the "," after "this"
Line 30, change "set" to --set of--
Line 45, delete the ":" after "preferred"

Column 12
Line 58, change "of" to --or--

Column 13
Line 13, delete the "," after "catalyst"

Column 15
Line 11, delete the "," after "reduction"
Lines 14-15, change "reductions," to --reduction--
Line 32, change "can-be" to --can be--

CERTIFICATE OF CORRECTION (continued)
U.S. Pat. No. 7,569,508 B2

Column 16
Line 22, change "where" to --were--
Line 39, change "Tin" to --tin--
Line 49, change "1.67.g" to --1.67 g--
Line 66, change "in a" to --in--

Column 18
Line 28, change "kin" to --in--
Line 44, change "heated" to --heat--

Column 19
Line 35, change "hour" to --hours--
Line 56, change "in" to --in a--

Column 21
Line 32, change "at" to --in a--

Column 22
Line 49, change "in" to --in the--
Line 64, change "into" to --into a--
Line 65, change "hour" to --hours--

Column 24
Line 10, delete the "," after "about"
Line 50, delete the "." after "platinum"

Column 25
Line 32, delete the "," after "and"
Line 41, change "filteration" to --filtration--
Line 66, change "form of" to --form of a--

Column 26
Line 46, change "oven" to --an oven--
Line 59, change "2h" to --2 h.--

Column 27
Line 57, change "fmal" to --final--
Line 58, change "sohltion" to --solution--
Line 61, change "Tin" to --tin--

UNITED STATES PATENT AND TRADEMARK OFFICE
CERTIFICATE OF CORRECTION

| | | |
|---|---|---|
| PATENT NO. | : 7,569,508 B2 | Page 1 of 1 |
| APPLICATION NO. | : 11/101241 | |
| DATED | : August 4, 2009 | |
| INVENTOR(S) | : Zhou et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1104 days.

Signed and Sealed this

Seventh Day of September, 2010

David J. Kappos
*Director of the United States Patent and Trademark Office*